(12) United States Patent
Zhang et al.

(10) Patent No.: US 12,041,679 B2
(45) Date of Patent: Jul. 16, 2024

(54) STATE CONFIGURATION METHOD AND DEVICE

(71) Applicant: HUAWEI TECHNOLOGIES CO., LTD., Guangdong (CN)

(72) Inventors: Meng Zhang, Shenzhen (CN); Jing Han, Beijing (CN); Hong Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 17/401,531

(22) Filed: Aug. 13, 2021

(65) Prior Publication Data

US 2021/0378045 A1     Dec. 2, 2021

Related U.S. Application Data

(63) Continuation of application No. PCT/CN2020/073132, filed on Jan. 20, 2020.

(30) Foreign Application Priority Data

Feb. 14, 2019   (CN) .......................... 201910114604.1

(51) Int. Cl.
*H04B 7/06* (2006.01)
*H04L 5/00* (2006.01)
*H04W 76/25* (2018.01)

(52) U.S. Cl.
CPC ........... *H04W 76/25* (2018.02); *H04L 5/0048* (2013.01)

(58) Field of Classification Search
CPC .... H04W 76/25; H04L 5/0048; H04L 5/0044; H04L 5/0096; H04B 7/0617
See application file for complete search history.

(56) References Cited

U.S. PATENT DOCUMENTS 11,277,301 B2 *  3/2022  Zhou ..................... H04W 72/23
11,337,265 B2 *  5/2022  Zhou .................... H04B 7/0626
(Continued)

FOREIGN PATENT DOCUMENTS

CA      2850569 C      3/2020
CN      109076560 A    12/2018
(Continued)

OTHER PUBLICATIONS

3GPP TSG RAN WG1 Meeting #92, R1-1803346 Title: Feature lead summary 2 on beam measurment and reporting (Year: 2018).*
(Continued)

*Primary Examiner* — Faruk Hamza
*Assistant Examiner* — Abusayeed M Haque

(57) ABSTRACT

This application discloses a state configuration method and a device, including: determining, by a terminal device, that a transmission configuration indicator (TCI) state configured by a network device changes; obtaining, by the terminal device, a first TCI state configured by the network device before the TCI state changes; configuring, by the terminal device, a second TCI state to be the same as the first TCI state; and when the second TCI state is the same as the first TCI state, a reference signal pointed by using the second TCI state and a reference signal pointed by using the first TCI state are quasi co-located; and after the TCI state changes and before a third TCI state configured by the network device is activated, sending and receiving, by the terminal device, data by using the second TCI state.

17 Claims, 20 Drawing Sheets

(56) References Cited

U.S. PATENT DOCUMENTS

| | | | |
|---|---|---|---|
| 2019/0115955 A1* | 4/2019 | John Wilson | H04L 5/0055 |
| 2019/0141693 A1* | 5/2019 | Guo | H04L 5/0044 |
| 2019/0174466 A1* | 6/2019 | Zhang | H04L 5/0057 |
| 2020/0221428 A1* | 7/2020 | Moon | H04B 7/024 |
| 2022/0052820 A1* | 2/2022 | Ling | H04L 5/0048 |

FOREIGN PATENT DOCUMENTS

| | | | |
|---|---|---|---|
| CN | 109257958 A | 1/2019 | |
| CN | 109314871 A | 2/2019 | |
| CN | 110351850 A | 10/2019 | |
| WO | 2014087145 A1 | 6/2014 | |
| WO | WO 20020053941 * | 9/2018 | H04L 27/2601 |
| WO | 2018232090 A1 | 12/2018 | |
| WO | WO-2002053941 * | 3/2019 | H04L 27/2601 |

OTHER PUBLICATIONS

3GPP TSG-RAN WG1 Meeting#109e, R1-220350 (Year: 2022).*

3GPP TSG RAN WG1 Meeting#97, R1-1907813 (Year: 2019).*

European Patent Office Extended Search Report dated Feb. 18, 2022 for Application No. 20755875.0, 9 pages.

Ericsson, Feature lead summary 2 on beam measurement and reporting. 3GPP TSG RAN WG1 Meeting #92, Athens, Greece, Feb. 26-Mar. 2, 2018, R1-1803346, 23 pages.

3GPP TS 38.213 V15.4.0 (Dec. 2018), 3rd Generation Partnership Project; Technical Specification Group Radio Access Network; NR; Physical layer procedures for control(Release 15), 104 pages.

3GPP TS 38.133 V15.4.0 (Dec. 2018), 3rd Generation Partnership Project; Technical Specification Group Radio Access Network; NR; Requirements for support of radio resource management (Release 15), 876 pages.

Qualcomm Incorporated, Beam management for NR. 3GPP TSG-RAN WG1 Meeting 92bis, Sanya, China Apr. 16-Apr. 20, 2018, R1-1804787, 8 pages.

3GPP TS 38.331 V15.4.0 (Dec. 2018), 3rd Generation Partnership Project; Technical Specification Group Radio Access Network; NR; Radio Resource Control (RRC) protocol specification (Release 15), 474 pages.

Qualcomm Incorporated, Remaining Details on QCL. 3GPP TSG RAN WG1 Meeting #92bis, Sanya, China, Apr. 16-20, 2018, R1-1804796, 10 pages.

3GPP TS 38.214 V15.4.0 (Dec. 2018), 3rd Generation Partnership Project; Technical Specification Group Radio Access Network; NR; Physical layer procedures for data(Release 15), 102 pages.

Office Action issued in CN 201910114604.1, dated Jan. 5, 2021, 7 pages.

International Search Report and Written Opinion issued in PCT/CN2020/073132, dated Apr. 8, 2020, 10 pages.

* cited by examiner

STATE CONFIGURATION METHOD AND DEVICE

CROSS-REFERENCE TO RELATED APPLICATIONS

This application is a continuation of International Application No. PCT/CN2020/073132, filed on Jan. 20, 2020, which claims priority to Chinese Patent Application No. 201910114604.1, filed on Feb. 14, 2019. The disclosures of the aforementioned applications are hereby incorporated by reference in their entireties.

TECHNICAL FIELD

This application relates to the field of communication technologies, and in particular, to a state configuration method and a device.

BACKGROUND

A new radio (NR) technology in a fifth generation mobile communication technology (5G) is similar to a long term evolution (LTE) technology in a fourth generation mobile communication technology (4G), and both enable information sending and receiving between a network device and a terminal device by using beam information.

In a current NR technology, a network device sends a transmission configuration indicator (TCI) to a terminal device, and indicates a quasi co-location (QCL) relationship between a corresponding reference signal of the terminal device and a configured reference signal by using different TCI states, that is, the terminal device may consider, by using a reference signal pointed by using a TCI state, that a state of a beam used by the network device for performing sending is the same as the pointed reference signal.

In a current technology, before a TCI state configured by the network device for the terminal device is activated by using a medium access control control element (MAC CE), the terminal device should assume that a reference signal pointed by using the TCI state is a synchronization signal block (SSB) determined when the terminal device initially accesses a cell.

In the current technology, a case in which a QCL relationship exists between the reference signal pointed by using the TCI state and the SSB defined in the cell can only be used in a case in which the terminal device initially accesses the cell and does not receive a command for activating the TCI state by using the MAC CE, but cannot be used in a case in which the terminal device has accessed the cell, because after the terminal device has accessed the cell, a transmit beam for the SSB may be different from scheduling of real data, or duration from last SSB measurement performed by the terminal device is excessively long. Therefore, a TCI state update solution provided in the current technology is not feasible. If a reference signal is determined based on the TCI state update solution in the current technology, data fails to be scheduled.

SUMMARY

Embodiments of this application provide a state configuration method and a device, to update a TCI state, and ensure correct sending and receiving of data.

To resolve the foregoing technical problem, the embodiments of this application provide the following technical solutions.

According to a first aspect, an embodiment of this application provides a state configuration method, including: determining, by a terminal device, that a TCI state configured by a network device changes; obtaining, by the terminal device, a first TCI state configured by the network device before the TCI state changes; configuring, by the terminal device, a second TCI state to be the same as the first TCI state; and when the second TCI state is the same as the first TCI state, a reference signal pointed by using the second TCI state and a reference signal pointed by using the first TCI state are quasi co-located; and after the TCI state changes and before a third TCI state configured by the network device is activated, sending and receiving, by the terminal device, data by using the second TCI state.

In this embodiment of this application, the first TCI state is a TCI state before the TCI state changes, and the third TCI state is a TCI state after the TCI state changes. Before the third TCI state is activated, in this embodiment of this application, the foregoing configured second TCI state may be used to send and receive data. Because the second TCI state is the same as the first TCI state, the terminal device continues to use the reference signal pointed by using the first TCI state that is before the TCI state changes. A current technology is no longer used. Before a new TCI state (namely, the third TCI state) is activated by the network device, the terminal device may continue to use an old TCI state (namely, the first TCI state) as a currently available TCI state (namely, the second TCI state). The reference signal pointed by using the old TCI state is more accurate and time-sensitive, so that data transmission performance is better, thereby ensuring correct sending and receiving of data.

In an implementation of the first aspect, the determining, by a terminal device, that a TCI state configured by a network device changes includes: receiving, by the terminal device, radio resource configuration (RRC) signaling sent by the network device, where the RRC signaling is used to indicate the terminal device to switch an uplink bandwidth part BWP or a downlink BWP, and the BWP switching causes the change in the TCI state configured by the network device; and determining, by the terminal device based on the received RRC signaling, that the TCI state changes. The network device may send the RRC signaling. The RRC signaling may trigger the terminal device to switch the BWP. When the BWP is switched, the TCI state configured by the network device changes. Therefore, if the terminal device receives the RRC signaling from the network device, the terminal device may determine, based on the RRC signaling, that the TCI state changes.

In an implementation of the first aspect, the obtaining, by the terminal device, a first TCI state configured by the network device before the TCI state changes includes: obtaining, by the terminal device, the first TCI state corresponding to a first downlink control channel for scheduling the RRC signaling, where the first downlink control channel is a downlink control channel before the TCI state changes. The RRC signaling is scheduled by using the first downlink control channel. For example, the first downlink control channel may be specifically a physical downlink control channel (PDCCH). The first downlink control channel is a downlink control channel before the TCI state changes, and the terminal device determines a TCI state corresponding to the first downlink control channel as the first TCI state.

In an implementation of the first aspect, the configuring, by the terminal device, a second TCI state to be the same as the first TCI state includes: configuring, by the terminal device, the second TCI state corresponding to a second downlink control channel to be the same as the first TCI state corresponding to the first downlink control channel, where the second downlink control channel is a downlink control channel after the TCI state changes. The second downlink control channel is a downlink control channel after the TCI state changes, that is, the second downlink control channel is a downlink control channel that needs to be used by the terminal device before the third TCI state is activated. The terminal device configures the second TCI state corresponding to the second downlink control channel to be the same as the first TCI state corresponding to the first downlink control channel, that is, the terminal device continues to use the first TCI state corresponding to the first downlink control channel for scheduling the RRC signaling.

In an implementation of the first aspect, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

After the TCI state configured by the network device changes, the terminal device may use a plurality of second downlink control channels. For example, the terminal device may use three second downlink control channels. All the second downlink control channels correspond to a same TCI state, that is, all the second downlink control channels correspond to the same second TCI state. It can be learned from the description of the foregoing embodiment that, because the second TCI state is the same as the first TCI state, when there are the plurality of second downlink control channels after the TCI state changes, the plurality of second downlink control channels continue to use the reference signal pointed by using the first TCI state to send and receive data. The same second TCI state is configured for the plurality of second downlink control channels, so that TCI state configurations for the plurality of second downlink control channels can be simplified, and data can be correctly sent and received on the plurality of second downlink control channels.

In some other embodiments of this application, the quantity of downlink control channels remains unchanged before and after the TCI state changes. That is, the quantity of second downlink control channels is the same as the quantity of first downlink control channels. For example, if there are three first downlink control channels before the TCI state changes, there are also three second downlink control channels after the TCI state changes. The second downlink control channel and the first downlink control channel whose channel identifiers are the same correspond to the same TCI state, that is, the second downlink control channel and the first downlink control channel with the same channel identifier correspond to the same TCI state. Therefore, a TCI state configuration of the second downlink control channel can be simplified, and it can be ensured that data can be correctly sent and received on the second downlink control channel.

In some other embodiments of this application, before the TCI state configured by the network device changes, the terminal device may use a plurality of first downlink control channels. For example, the terminal device may use three first downlink control channels. When there are the plurality of first downlink control channels before the TCI state changes, the first downlink control channel corresponding to the first TCI state that is the same as the second TCI state is the predefined downlink control channel, that is, when there are the plurality of first downlink control channels, the first TCI state corresponding to the predefined downlink control channel may be used to configure the second TCI state.

In an implementation of the first aspect, the obtaining, by the terminal device, a first TCI state configured by the network device before the TCI state changes includes: obtaining, by the terminal device, the first TCI state corresponding to a first downlink shared channel that carries the RRC signaling, where the first downlink shared channel is a downlink shared channel before the TCI state changes. The RRC signaling may be carried on the first downlink shared channel. For example, the first downlink shared channel may be specifically a physical downlink shared channel (PDSCH). The first downlink shared channel is a downlink shared channel before the TCI state changes, and the terminal device determines a TCI state corresponding to the first downlink shared channel as the first TCI state.

In an implementation of the first aspect, the configuring, by the terminal device, a second TCI state to be the same as the first TCI state includes: configuring, by the terminal device, the second TCI state corresponding to a second downlink shared channel to be the same as the first TCI state corresponding to the first downlink shared channel, where the second downlink shared channel is a downlink shared channel after the TCI state changes; or configuring, by the terminal device, the second TCI state corresponding to a first uplink shared channel to be the same as the first TCI state corresponding to the first downlink shared channel, where the first uplink shared channel is an uplink shared channel after the TCI state changes. The second downlink shared channel is a downlink shared channel after the TCI state changes, that is, the second downlink shared channel is a downlink shared channel that needs to be used by the terminal device before the third TCI state is activated. The terminal device configures the second TCI state corresponding to the second downlink shared channel to be the same as the first TCI state corresponding to the first downlink shared channel, that is, the terminal device continues to use the first TCI state corresponding to the first downlink shared channel for scheduling the RRC signaling.

Configurations of the second TCI states corresponding to the PDCCH and the PDSCH used by the terminal device are described in the foregoing content. The following describes a configuration manner of the second TCI state corresponding to a physical uplink shared channel (PUSCH). For example, the first uplink shared channel is an uplink shared channel after the TCI state changes, that is, the first uplink shared channel is an uplink shared channel that needs to be used by the terminal device before the third TCI state is activated. The terminal device configures the second TCI state corresponding to the first uplink shared channel to be the same as the first TCI state corresponding to the first downlink shared channel, that is, the terminal device continues to use the first TCI state corresponding to the first downlink shared channel for scheduling the RRC signaling.

In an implementation of the first aspect, the determining, by a terminal device, that a TCI state configured by a network device changes includes: receiving, by the terminal device, DCI sent by the network device, where the DCI is used to indicate the terminal device to switch an uplink BWP or a downlink BWP, and the BWP switching causes the change in the TCI state configured by the network device;

and determining, by the terminal device based on the received DCI, that the TCI state changes. The network device may send the DCI. The DCI may trigger the terminal device to switch the BWP. When the BWP is switched, the TCI state configured by the network device changes. Therefore, if the terminal device receives the DCI from the network device, the terminal device may determine, based on the DCI, that the TCI state changes.

In an implementation of the first aspect, the obtaining, by the terminal device, a first TCI state configured by the network device before the TCI state changes includes: obtaining, by the terminal device, the first TCI state corresponding to a third downlink control channel that carries the DCI, where the third downlink control channel is a downlink control channel before the TCI state changes. The DCI is carried on the third downlink control channel. For example, the third downlink control channel may be specifically a PDCCH. The third downlink control channel is a downlink control channel before the TCI state changes, and the terminal device determines a TCI state corresponding to the third downlink control channel as the first TCI state.

In an implementation of the first aspect, the configuring, by the terminal device, a second TCI state to be the same as the first TCI state includes: configuring, by the terminal device, the second TCI state corresponding to a fourth downlink control channel to be the same as the first TCI state corresponding to the third downlink control channel, where the fourth downlink control channel is a downlink control channel after the TCI state changes. The fourth downlink control channel is a downlink control channel after the TCI state changes, that is, the fourth downlink control channel is a downlink control channel that needs to be used by the terminal device before the third TCI state is activated. The terminal device configures the second TCI state corresponding to the fourth downlink control channel to be the same as the first TCI state corresponding to the third downlink control channel, that is, the terminal device continues to use the first TCI state corresponding to the third downlink control channel for scheduling the RRC signaling.

In an implementation of the first aspect, when there are a plurality of fourth downlink control channels after the TCI state changes, second TCI states corresponding to all the fourth downlink control channels are the same; or a quantity of fourth downlink control channels and a quantity of third downlink control channels are the same, and a fourth downlink control channel and a third downlink control channel whose channel identifiers are the same correspond to a same TCI state; or when there are a plurality of third downlink control channels before the TCI state changes, the third downlink control channel corresponding to the first TCI state that is the same as the second TCI state is a predefined downlink control channel. The description of the fourth downlink control channel may be analogous to the description of the foregoing second downlink control channel. The third downlink control channel herein may be analogous to the description of the foregoing first downlink control channel.

In an implementation of the first aspect, the configuring, by the terminal device, a second TCI state to be the same as the first TCI state includes: configuring, by the terminal device, the second TCI state corresponding to a third downlink shared channel to be the same as the first TCI state corresponding to the third downlink control channel, where the third downlink shared channel is a downlink shared channel after the TCI state changes; or configuring, by the terminal device, the second TCI state corresponding to a second uplink shared channel to be the same as the first TCI state corresponding to the third downlink control channel, where the second uplink shared channel is an uplink shared channel after the TCI state changes.

The third downlink shared channel is a downlink shared channel after the TCI state changes, that is, the third downlink shared channel is a downlink shared channel that needs to be used by the terminal device before the third TCI state is activated. The terminal device configures the second TCI state corresponding to the third downlink shared channel to be the same as the first TCI state corresponding to the third downlink control channel, that is, the terminal device continues to use the first TCI state corresponding to the third downlink control channel for scheduling the RRC signaling.

Configurations of the second TCI states corresponding to the PDCCH and the PDSCH used by the terminal device are described in the foregoing content. The following describes a configuration manner of the second TCI state corresponding to a PUSCH. For example, the second uplink shared channel is an uplink shared channel after the TCI state changes, that is, the second uplink shared channel is an uplink shared channel that needs to be used by the terminal device before the third TCI state is activated. The terminal device configures the second TCI state corresponding to the second uplink shared channel to be the same as the first TCI state corresponding to the third downlink control channel, that is, the terminal device continues to use the first TCI state corresponding to the third downlink control channel for scheduling the RRC signaling.

In an implementation of the first aspect, the obtaining, by the terminal device, a first TCI state configured by the network device before the TCI state changes includes: obtaining, by the terminal device, the first TCI state corresponding to a fourth downlink shared channel or a third uplink shared channel, where the fourth downlink shared channel is a downlink shared channel before the DCI is received, and the third uplink shared channel is an uplink shared channel before the DCI is received. The first TCI state obtained by the terminal device may correspond to the fourth downlink shared channel, or the first TCI state may correspond to the third uplink shared channel.

In an implementation of the first aspect, the configuring, by the terminal device, a second TCI state to be the same as the first TCI state includes: configuring, by the terminal device, the second TCI state corresponding to a fifth downlink shared channel to be the same as the first TCI state corresponding to the fourth downlink shared channel, where the fifth downlink shared channel is a downlink shared channel after the TCI state changes; or configuring, by the terminal device, the second TCI state corresponding to a fifth downlink shared channel to be the same as the first TCI state corresponding to the third uplink shared channel; or configuring, by the terminal device, the second TCI state corresponding to a fourth uplink shared channel to be the same as the first TCI state corresponding to the fourth downlink shared channel, where the fourth uplink shared channel is an uplink shared channel after the TCI state changes; or configuring, by the terminal device, the second TCI state corresponding to a fourth uplink shared channel to be the same as the first TCI state corresponding to the third uplink shared channel.

The fifth downlink shared channel is a downlink shared channel after the TCI state changes. The second TCI state corresponding to the fifth downlink shared channel may be configured based on the first TCI state corresponding to the fourth downlink shared channel. Alternatively, the second TCI state corresponding to the fifth downlink shared channel may be configured based on the first TCI state corresponding to the third uplink shared channel. Similarly, the fourth uplink shared channel is an uplink shared channel after the TCI state changes. The second TCI state corresponding to the fourth uplink shared channel may be configured based on the first TCI state corresponding to the fourth downlink shared channel. Alternatively, the second TCI state corresponding to the fourth uplink shared channel may be configured based on the first TCI state corresponding to the third uplink shared channel. Therefore, in this embodiment of this application, the terminal device may both configure the second TCI state corresponding to the fifth downlink shared channel and configure the second TCI state corresponding to the fourth uplink shared channel by continuing to use the first TCI state configured by the network device before the TCI state changes. Therefore, it is ensured that data can be correctly sent and received on the fifth downlink shared channel and the fourth uplink shared channel.

In an implementation of the first aspect, the determining, by a terminal device, that a TCI state configured by a network device changes includes at least one of the following steps: when a timer jointly maintained by the terminal device and the network device expires, switching, by the terminal device, an uplink BWP or a downlink BWP; or when a random access process is triggered, switching, by the terminal device, an uplink BWP or a downlink BWP to perform the random access process, where when the BWP is switched, the TCI state configured by the network device changes, and the TCI state configured by the network device is used to send and receive data between the terminal device and the network device.

In an implementation of the first aspect, the obtaining, by the terminal device, a first TCI state configured by the network device before the TCI state changes includes: when duration corresponding to the timer is less than or equal to a preset threshold, obtaining, by the terminal device, the first TCI state that is before the timer is started; or when the duration is greater than the preset threshold, measuring, by the terminal device, a reference signal, sending an SSB identifier or a CSI-RS identifier to the network device, and obtaining, by the terminal device, the first TCI state corresponding to the SSB identifier or the CSI-RS identifier. The threshold is a value preconfigured by the network device, and a specific value is not limited herein. Based on the relationship between the duration corresponding to the timer and the threshold, different manners are used for obtaining the first TCI state.

In an implementation of the first aspect, the configuring, by the terminal device, a second TCI state to be the same as the first TCI state includes: configuring, by the terminal device, the second TCI state corresponding to a fifth downlink control channel to be the same as the first TCI state that is before the timer is started, where the fifth downlink control channel is a downlink control channel after the TCI state changes; or configuring, by the terminal device, the second TCI state corresponding to a sixth downlink shared channel to be the same as the first TCI state that is before the timer is started, where the sixth downlink shared channel is a downlink shared channel after the TCI state changes; or configuring, by the terminal device, the second TCI state corresponding to a fifth uplink shared channel to be the same as the first TCI state that is before the timer is started, where the fifth uplink shared channel is an uplink shared channel after the TCI state changes. In the foregoing embodiment of this application, the terminal device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In an implementation of the first aspect, the configuring, by the terminal device, a second TCI state to be the same as the first TCI state includes: configuring, by the terminal device, the second TCI state corresponding to a fifth downlink control channel to be the same as the first TCI state corresponding to the SSB identifier or the CSI-RS identifier, where the fifth downlink control channel is a downlink control channel after the TCI state changes; or configuring, by the terminal device, the second TCI state corresponding to a sixth downlink shared channel to be the same as the first TCI state corresponding to the SSB identifier or the CSI-RS identifier, where the sixth downlink shared channel is a downlink shared channel after the TCI state changes; or configuring, by the terminal device, the second TCI state corresponding to a fifth uplink shared channel to be the same as the first TCI state corresponding to the SSB identifier or the CSI-RS identifier, where the fifth uplink shared channel is an uplink shared channel after the TCI state changes.

In the foregoing embodiment of this application, the terminal device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In some embodiments of this application, the obtaining, by the terminal device, a first TCI state configured by the network device before the TCI state changes includes: when the terminal device is in a connected mode, obtaining, by the terminal device, a random access trigger instruction, where the random access trigger instruction is used to indicate the terminal device to obtain a random access channel (RACH) resource; and obtaining, by the terminal device, the first TCI state corresponding to a reference signal associated with the RACH resource.

In an implementation of the first aspect, the configuring, by the terminal device, a second TCI state to be the same as the first TCI state includes: configuring, by the terminal device, the second TCI state corresponding to a sixth downlink control channel to be the same as the first TCI state corresponding to the reference signal associated with the RACH resource, where the sixth downlink control channel is a downlink control channel after the TCI state changes; or configuring, by the terminal device, the second TCI state corresponding to a seventh downlink shared channel to be the same as the first TCI state corresponding to the reference signal associated with the RACH resource, where the seventh downlink shared channel is a downlink shared channel after the TCI state changes; or configuring, by the terminal device, the second TCI state corresponding to a sixth uplink shared channel to be the same as the first TCI state corresponding to the reference signal associated with the RACH resource, where the sixth uplink shared channel is an uplink shared channel after the TCI state changes. In the foregoing embodiment of this application, the terminal device may both configure the second TCI state corresponding to the seventh downlink shared channel and configure the second TCI state corresponding to the sixth uplink shared channel by continuing to use the first TCI state configured by the network device before the TCI state changes. Therefore, it is ensured that data can be correctly sent and received on the seventh downlink shared channel and the sixth uplink shared channel.

In an implementation of the first aspect, the determining, by a terminal device, that a TCI state configured by a network device changes includes: in a secondary cell activation process, determining, by the terminal device, that no TCI state is configured for a first reference signal used for measuring a channel quality indicator (CQI) in a secondary cell.

In an implementation of the first aspect, the obtaining, by the terminal device, a first TCI state configured by the network device before the TCI state changes includes: determining, by the terminal device, the first TCI state corresponding to a second reference signal reported by the terminal device to the network device.

In an implementation of the first aspect, the configuring, by the terminal device, a second TCI state to be the same as the first TCI state includes: configuring, by the terminal device, the second TCI state corresponding to the first reference signal to be the same as the first TCI state corresponding to the second reference signal; or configuring, by the terminal device, the second TCI state corresponding to a seventh downlink control channel to be the same as the first TCI state corresponding to the second reference signal, where the seventh downlink control channel is a downlink control channel after the TCI state changes; or configuring, by the terminal device, the second TCI state corresponding to an eighth downlink shared channel to be the same as the first TCI state corresponding to the second reference signal, where the eighth downlink shared channel is a downlink shared channel after the TCI state changes.

According to a second aspect, an embodiment of this application provides a state configuration method, including: when a TCI state configured by a network device changes, obtaining, by the network device, a first TCI state configured by the network device before the TCI state changes; configuring, by the network device, a second TCI state to be the same as the first TCI state; and when the second TCI state is the same as the first TCI state, a reference signal pointed by using the second TCI state and a reference signal pointed by using the first TCI state are quasi co-located; and after the TCI state changes and before a third TCI state configured by the network device is activated, sending and receiving, by the network device, data by using the second TCI state.

In an implementation of the second aspect, determining, by the network device, that the TCI state configured by the network device changes includes: sending, by the network device, radio resource configuration RRC signaling to a terminal device, where the RRC signaling is used to indicate the terminal device to switch an uplink bandwidth part BWP or a downlink BWP, and the BWP switching causes the change in the TCI state configured by the network device; and determining, by the network device based on the sent RRC signaling, that the TCI state changes.

In an implementation of the second aspect, the obtaining, by the network device, a first TCI state configured by the network device before the TCI state changes includes: obtaining, by the network device, the first TCI state corresponding to a first downlink control channel for scheduling the RRC signaling, where the first downlink control channel is a downlink control channel before the TCI state changes.

In an implementation of the second aspect, the configuring, by the network device, a second TCI state to be the same as the first TCI state includes: configuring, by the network device, the second TCI state corresponding to a second downlink control channel to be the same as the first TCI state corresponding to the first downlink control channel, where the second downlink control channel is a downlink control channel after the TCI state changes.

In an implementation of the second aspect, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

In an implementation of the second aspect, the obtaining, by the network device, a first TCI state configured by the network device before the TCI state changes includes: obtaining, by the network device, the first TCI state corresponding to a first downlink shared channel that carries the RRC signaling, where the first downlink shared channel is a downlink shared channel before the TCI state changes.

In an implementation of the second aspect, the configuring, by the network device, a second TCI state to be the same as the first TCI state includes: configuring, by the network device, the second TCI state corresponding to a second downlink shared channel to be the same as the first TCI state corresponding to the first downlink shared channel, where the second downlink shared channel is a downlink shared channel after the TCI state changes; or configuring, by the network device, the second TCI state corresponding to a first uplink shared channel to be the same as the first TCI state corresponding to the first downlink shared channel, where the first uplink shared channel is an uplink shared channel after the TCI state changes.

In an implementation of the second aspect, determining, by the network device, that the TCI state configured by the network device changes includes: sending, by the network device, DCI to a terminal device, where the DCI is used to indicate the terminal device to switch an uplink BWP or a downlink BWP, and the BWP switching causes the change in the TCI state configured by the network device; and determining, by the network device based on the received DCI, that the TCI state changes. The network device may send the DCI. The DCI may trigger the terminal device to switch the BWP. When the BWP is switched, the TCI state configured by the network device changes. Therefore, if the network device sends the DCI to the terminal device, the network device may determine, based on the DCI, that the TCI state changes. For example, the network device sends the DCI to the terminal device, where a DCI format used for the DCI is 0_1 or 1_1, to indicate the terminal device to switch to another BWP to work.

In an implementation of the second aspect, the obtaining, by the network device, a first TCI state configured by the network device before the TCI state changes includes: obtaining, by the network device, the first TCI state corresponding to a third downlink control channel that carries the DCI, where the third downlink control channel is a downlink control channel before the TCI state changes. The DCI is carried on the third downlink control channel. For example, the third downlink control channel may be specifically a PDCCH. The third downlink control channel is a downlink control channel before the TCI state changes, and the network device determines a TCI state corresponding to the third downlink control channel as the first TCI state.

In an implementation of the second aspect, the configuring, by the network device, a second TCI state to be the same as the first TCI state includes: configuring, by the network device, the second TCI state corresponding to a fourth downlink control channel to be the same as the first TCI state corresponding to the third downlink control channel, where the fourth downlink control channel is a downlink control channel after the TCI state changes. The fourth downlink control channel is a downlink control channel after the TCI state changes, that is, the fourth downlink control channel is a downlink control channel that needs to be used by the network device before the third TCI state is activated. The network device configures the second TCI state corresponding to the fourth downlink control channel to be the same as the first TCI state corresponding to the third downlink control channel, that is, the network device continues to use the first TCI state corresponding to the third downlink control channel for scheduling the RRC signaling.

In an implementation of the first aspect, when there are a plurality of fourth downlink control channels after the TCI state changes, second TCI states corresponding to all the fourth downlink control channels are the same; or a quantity of fourth downlink control channels and a quantity of third downlink control channels are the same, and a fourth downlink control channel and a third downlink control channel whose channel identifiers are the same correspond to a same TCI state; or when there are a plurality of third downlink control channels after the TCI state changes, the third downlink control channel corresponding to the first TCI state that is the same as the second TCI state is a predefined downlink control channel. The description of the fourth downlink control channel may be analogous to the description of the foregoing second downlink control channel. The third downlink control channel herein may be analogous to the description of the foregoing first downlink control channel.

In an implementation of the second aspect, the configuring, by the network device, a second TCI state to be the same as the first TCI state includes: configuring, by the network device, the second TCI state corresponding to a third downlink shared channel to be the same as the first TCI state corresponding to the third downlink control channel, where the third downlink shared channel is a downlink shared channel after the TCI state changes; or configuring, by the network device, the second TCI state corresponding to a second uplink shared channel to be the same as the first TCI state corresponding to the third downlink control channel, where the second uplink shared channel is an uplink shared channel after the TCI state changes. The third downlink shared channel is a downlink shared channel after the TCI state changes, that is, the third downlink shared channel is a downlink shared channel that needs to be used by the network device before the third TCI state is activated. The network device configures the second TCI state corresponding to the third downlink shared channel to be the same as the first TCI state corresponding to the third downlink control channel, that is, the network device continues to use the first TCI state corresponding to the third downlink control channel for scheduling the RRC signaling.

Configurations of the second TCI states corresponding to the PDCCH and the PDSCH used by the network device are described in the foregoing content. The following describes a configuration manner of the second TCI state corresponding to a PUSCH. For example, the second uplink shared channel is an uplink shared channel after the TCI state changes, that is, the second uplink shared channel is an uplink shared channel that needs to be used by the network device before the third TCI state is activated. The network device configures the second TCI state corresponding to the second uplink shared channel to be the same as the first TCI state corresponding to the third downlink control channel, that is, the network device continues to use the first TCI state corresponding to the third downlink control channel for scheduling the RRC signaling.

In an implementation of the second aspect, the obtaining, by the network device, a first TCI state configured by the network device before the TCI state changes includes: obtaining, by the network device, the first TCI state corresponding to a fourth downlink shared channel or a third uplink shared channel, where the fourth downlink shared channel is a downlink shared channel before the DCI is received, and the third uplink shared channel is an uplink shared channel before the DCI is received. The first TCI state obtained by the network device may correspond to the fourth downlink shared channel, or the first TCI state may correspond to the third uplink shared channel.

In an implementation of the second aspect, the configuring, by the network device, a second TCI state to be the same as the first TCI state includes: configuring, by the network device, the second TCI state corresponding to a fifth downlink shared channel to be the same as the first TCI state corresponding to the fourth downlink shared channel, where the fifth downlink shared channel is a downlink shared channel after the TCI state changes; or configuring, by the network device, the second TCI state corresponding to a fifth downlink shared channel to be the same as the first TCI state corresponding to the third uplink shared channel; or configuring, by the network device, the second TCI state corresponding to a fourth uplink shared channel to be the same as the first TCI state corresponding to the fourth downlink shared channel, where the fourth uplink shared channel is an uplink shared channel after the TCI state changes; or configuring, by the network device, the second TCI state corresponding to a fourth uplink shared channel to be the same as the first TCI state corresponding to the third uplink shared channel.

The fifth downlink shared channel is a downlink shared channel after the TCI state changes. The second TCI state corresponding to the fifth downlink shared channel may be configured based on the first TCI state corresponding to the fourth downlink shared channel. Alternatively, the second TCI state corresponding to the fifth downlink shared channel may be configured based on the first TCI state corresponding to the third uplink shared channel. Similarly, the fourth uplink shared channel is an uplink shared channel after the TCI state changes. The second TCI state corresponding to the fourth uplink shared channel may be configured based on the first TCI state corresponding to the fourth downlink shared channel. Alternatively, the second TCI state corresponding to the fourth uplink shared channel may be configured based on the first TCI state corresponding to the third uplink shared channel. Therefore, in this embodiment of this application, the network device may both configure the second TCI state corresponding to the fifth downlink shared channel and configure the second TCI state corresponding to the fourth uplink shared channel by continuing to use the first TCI state configured by the network device before the TCI state changes. Therefore, it is ensured that data can be correctly sent and received on the fifth downlink shared channel and the fourth uplink shared channel.

In an implementation of the second aspect, the obtaining, by the network device, a first TCI state configured by the network device before the TCI state changes includes: when duration corresponding to a timer is less than or equal to a preset threshold, obtaining, by the network device, the first TCI state that is before the timer is started; or when the duration is greater than the preset threshold, receiving, by the network device, an SSB identifier or a CSI-RS identifier reported by the terminal device, and obtaining, by the network device, the first TCI state corresponding to the SSB identifier or the CSI-RS identifier. The threshold is a value preconfigured by the network device, and a specific value is not limited herein. Based on the relationship between the duration corresponding to the timer and the threshold, different manners are used for obtaining the first TCI state.

In an implementation of the second aspect, the configuring, by the network device, a second TCI state to be the same as the first TCI state includes: configuring, by the network device, the second TCI state corresponding to a fifth downlink control channel to be the same as the first TCI state that is before the timer is started, where the fifth downlink control channel is a downlink control channel after the TCI state changes; or configuring, by the network device, the second TCI state corresponding to a sixth downlink shared channel to be the same as the first TCI state that is before the timer is started, where the sixth downlink shared channel is a downlink shared channel after the TCI state changes; or configuring, by the network device, the second TCI state corresponding to a fifth uplink shared channel to be the same as the first TCI state that is before the timer is started, where the fifth uplink shared channel is an uplink shared channel after the TCI state changes. In the foregoing embodiment of this application, the network device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In an implementation of the second aspect, the configuring, by the network device, a second TCI state to be the same as the first TCI state includes: configuring, by the network device, the second TCI state corresponding to a fifth downlink control channel to be the same as the first TCI state corresponding to the SSB identifier or the CSI-RS identifier, where the fifth downlink control channel is a downlink control channel after the TCI state changes; or configuring, by the network device, the second TCI state corresponding to a sixth downlink shared channel to be the same as the first TCI state corresponding to the SSB identifier or the CSI-RS identifier, where the sixth downlink shared channel is a downlink shared channel after the TCI state changes; or configuring, by the network device, the second TCI state corresponding to a fifth uplink shared channel to be the same as the first TCI state corresponding to the SSB identifier or the CSI-RS identifier, where the fifth uplink shared channel is an uplink shared channel after the TCI state changes.

In the foregoing embodiment of this application, the network device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In an implementation of the second aspect, the obtaining, by the network device, a first TCI state configured by the network device before the TCI state changes includes: sending, by the network device, a random access trigger instruction to the terminal device, where the random access trigger instruction is used to indicate the terminal device to obtain an RACH resource; and obtaining, by the network device, the first TCI state corresponding to a reference signal associated with the RACH resource.

In an implementation of the second aspect, the configuring, by the network device, a second TCI state to be the same as the first TCI state includes: configuring, by the network device, the second TCI state corresponding to a sixth downlink control channel to be the same as the first TCI state corresponding to the reference signal associated with the RACH resource, where the sixth downlink control channel is a downlink control channel after the TCI state changes; or configuring, by the network device, the second TCI state corresponding to a seventh downlink shared channel to be the same as the first TCI state corresponding to the reference signal associated with the RACH resource, where the seventh downlink shared channel is a downlink shared channel after the TCI state changes; or configuring, by the network device, the second TCI state corresponding to a sixth uplink shared channel to be the same as the first TCI state corresponding to the reference signal associated with the RACH resource, where the sixth uplink shared channel is an uplink shared channel after the TCI state changes.

In the foregoing embodiment of this application, the network device may both configure the second TCI state corresponding to the seventh downlink shared channel and configure the second TCI state corresponding to the sixth uplink shared channel by continuing to use the first TCI state configured by the network device before the TCI state changes. Therefore, it is ensured that data can be correctly sent and received on the seventh downlink shared channel and the sixth uplink shared channel.

In an implementation of the second aspect, the obtaining, by the network device, a first TCI state configured by the network device before the TCI state changes includes: determining, by the network device, the first TCI state corresponding to a second reference signal reported by the terminal device to the network device.

In an implementation of the second aspect, the configuring, by the network device, a second TCI state to be the same as the first TCI state includes: configuring, by the network device, the second TCI state corresponding to the first reference signal to be the same as the first TCI state corresponding to the second reference signal; or configuring, by the network device, the second TCI state corresponding to a seventh downlink control channel to be the same as the first TCI state corresponding to the second reference signal, where the seventh downlink control channel is a downlink control channel after the TCI state changes; or configuring, by the network device, the second TCI state corresponding to an eighth downlink shared channel to be the same as the first TCI state corresponding to the second reference signal, where the eighth downlink shared channel is a downlink shared channel after the TCI state changes.

In the second aspect, the configuration and use of the TCI state by the network device are similar to those on a terminal device side. The network device and the terminal device can perform data sending and receiving with each other only when the network device and the terminal device use a same second TCI state configuration manner.

According to a third aspect, an embodiment of this application further provides a terminal device, including: a processing unit, configured to determine that a TCI state configured by a network device changes, where the processing unit is further configured to obtain a first TCI state configured by the network device before the TCI state changes; and the processing unit is further configured to configure a second TCI state to be the same as the first TCI state; and when the second TCI state is the same as the first TCI state, a reference signal pointed by using the second TCI state and a reference signal pointed by using the first TCI state are quasi co-located; and a transceiver unit, configured to: after the TCI state changes and before a third TCI state configured by the network device is activated, send and receive data by using the second TCI state.

In an implementation of the third aspect, the transceiver unit is further configured to receive radio resource configuration RRC signaling sent by the network device, where the RRC signaling is used to indicate the terminal device to switch an uplink bandwidth part BWP or a downlink BWP, and the BWP switching causes the change in the TCI state configured by the network device; and the processing unit is specifically configured to determine, based on the received RRC signaling, that the TCI state changes.

In an implementation of the third aspect, the processing unit is specifically configured to obtain the first TCI state corresponding to a first downlink control channel for scheduling the RRC signaling, and the first downlink control channel is a downlink control channel before the TCI state changes.

In an implementation of the third aspect, the processing unit is specifically configured to configure the second TCI state corresponding to a second downlink control channel to be the same as the first TCI state corresponding to the first downlink control channel, and the second downlink control channel is a downlink control channel after the TCI state changes.

In an implementation of the third aspect, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

In an implementation of the third aspect, the processing unit is specifically configured to obtain the first TCI state corresponding to a first downlink shared channel that carries the RRC signaling, and the first downlink shared channel is a downlink shared channel before the TCI state changes.

In an implementation of the third aspect, the processing unit is specifically configured to configure the second TCI state corresponding to a second downlink shared channel to be the same as the first TCI state corresponding to the first downlink shared channel, and the second downlink shared channel is a downlink shared channel after the TCI state changes; or the processing unit is specifically configured to configure the second TCI state corresponding to a first uplink shared channel to be the same as the first TCI state corresponding to the first downlink shared channel, and the first uplink shared channel is an uplink shared channel after the TCI state changes.

According to a fourth aspect, an embodiment of this application further provides a network device, including: a processing unit, configured to: when a TCI state configured by the network device changes, obtain a first TCI state configured by the network device before the TCI state changes, where the processing unit is further configured to configure a second TCI state to be the same as the first TCI state; and when the second TCI state is the same as the first TCI state, a reference signal pointed by using the second TCI state and a reference signal pointed by using the first TCI state are quasi co-located; and a transceiver unit, configured to: after the TCI state changes and before a third TCI state configured by the network device is activated, send and receive data by using the second TCI state.

In an implementation of the fourth aspect, the transceiver unit is further configured to send radio resource configuration RRC signaling to a terminal device, where the RRC signaling is used to indicate the terminal device to switch an uplink bandwidth part BWP or a downlink BWP, and the BWP switching causes the change in the TCI state configured by the network device; and the processing unit is specifically configured to determine, based on the sent RRC signaling, that the TCI state changes.

In an implementation of the fourth aspect, the processing unit is specifically configured to obtain the first TCI state corresponding to a first downlink control channel for scheduling the RRC signaling, and the first downlink control channel is a downlink control channel before the TCI state changes.

In an implementation of the fourth aspect, the processing unit is specifically configured to configure the second TCI state corresponding to a second downlink control channel to be the same as the first TCI state corresponding to the first downlink control channel, and the second downlink control channel is a downlink control channel after the TCI state changes.

In an implementation of the fourth aspect, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

In an implementation of the fourth aspect, the processing unit is specifically configured to obtain the first TCI state corresponding to a first downlink shared channel that carries the RRC signaling, and the first downlink shared channel is a downlink shared channel before the TCI state changes.

In an implementation of the fourth aspect, the processing unit is specifically configured to configure the second TCI state corresponding to a second downlink shared channel to be the same as the first TCI state corresponding to the first downlink shared channel, and the second downlink shared channel is a downlink shared channel after the TCI state changes; or the processing unit is specifically configured to configure the second TCI state corresponding to a first uplink shared channel to be the same as the first TCI state corresponding to the first downlink shared channel, and the first uplink shared channel is an uplink shared channel after the TCI state changes.

Effects achieved by the possible designs of the communication devices according to the third aspect and the fourth aspect are the same as effects achieved by corresponding possible designs of the method according to the first aspect and the second aspect.

According to a fifth aspect, a communication device is provided. The communication device includes a processor and a transceiver. The processor performs the methods according to the first aspect and the second aspect.

According to a sixth aspect, a communication device is provided. The communication device includes a processor and an interface. The processor performs the methods according to the first aspect and the second aspect.

According to a seventh aspect, a communication device is provided. The communication device includes a memory, a processor, and a program that is stored in the memory and that can run on the processor. When executing the program, the processor implements the methods according to the first aspect and the second aspect. It should be noted that the memory may be a non-volatile memory, or may be a volatile memory. The memory may be located inside the communication device, or may be located outside the communication device.

According to an eighth aspect, a communication device is provided. The communication device may use the methods according to the first aspect and the second aspect. The communication device may be a network device or a terminal device, or may be hardware that implements a similar function.

According to a ninth aspect, a communication system is provided. The communication system includes the foregoing terminal device and the foregoing network device.

According to a tenth aspect, a computer-readable storage medium is provided. The computer-readable storage medium is configured to store a computer program. The computer program includes instructions used to perform the method according to any possible implementation of the first aspect and the second aspect.

According to an eleventh aspect, a computer program product is provided. The computer program product includes computer program code. When the computer program code runs on a computer, the computer is enabled to perform the method according to any possible implementation of the first aspect and the second aspect.

DESCRIPTION OF EMBODIMENTS

Figure 1:
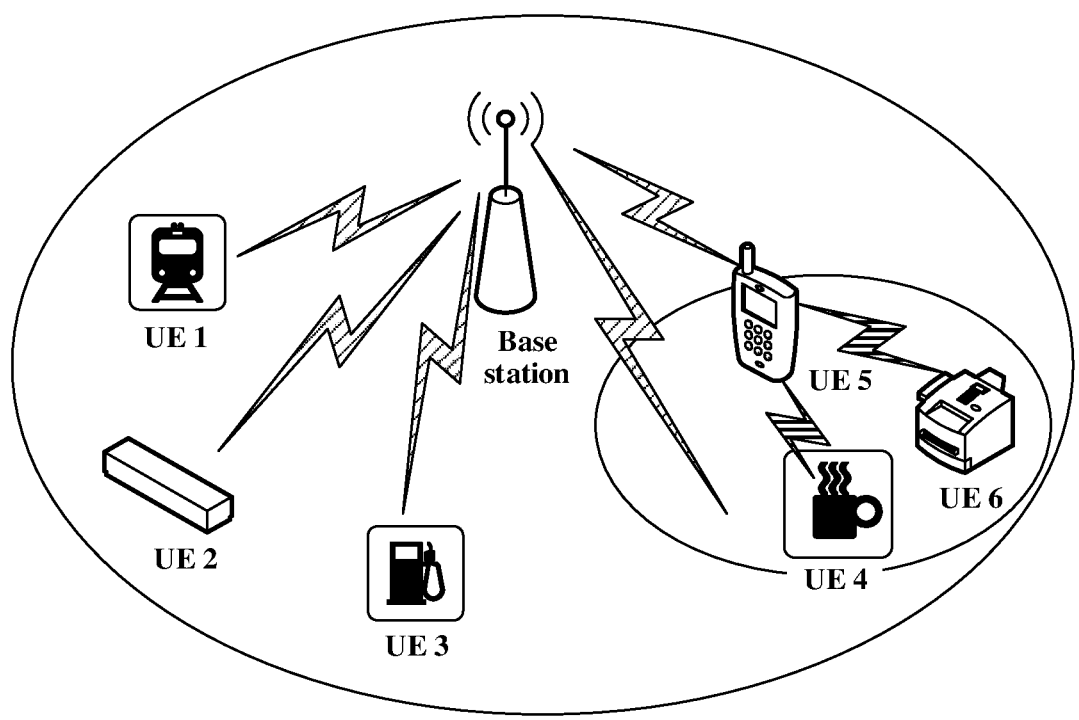
FIG. 1 is a schematic architectural diagram of a communication system to which a state configuration method according to an embodiment of this application is applied.

Embodiments of this application provide a state configuration method and a device, to update a TCI state, and ensure correct sending and receiving of data.

The following describes example embodiments of this application with reference to the accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in a proper circumstance, which is merely a discrimination manner that is used when objects having a same attribute are described in the embodiments of this application. In addition, the terms "include", "have" and any other variants mean to cover non-exclusive inclusion, so that a process, method, system, product, or device that includes a series of units is not necessarily limited to those units, but may include other units not expressly listed or inherent to the process, method, system, product, or device.

The technical solutions in the embodiments of this application may be applied to various communication systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system can implement wireless technologies such as universal radio terrestrial access (UTRA) and CDMA2000. The UTRA may include a wideband CDMA (WCDMA) technology and other variant technologies of CDMA. The CDMA2000 may cover the interim standard (IS) 2000 (IS-2000), the IS-95 standard, and the IS-856 standard. The TDMA system can implement wireless technologies such as global system for mobile communications (GSM). The OFDMA system can implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and flash OFDMA. The UTRA corresponds to a UMTS, and the E-UTRA corresponds to an evolved version of the UMTS. In 3GPP, long term evolution (LTE) and various versions evolved based on the LTE are new UMTS versions using the E-UTRA. A 5th generation (5 Generation, "5G" for short) communication system or new radio (NR) is a next generation communication system under study. In addition, the communication systems may be further applicable to a future-oriented communication technology, and are all applicable to the technical solutions provided in the embodiments of this application. A system architecture and a service scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

FIG. 1 is a schematic structural diagram of a possible radio access network (RAN) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one network device or a plurality of network devices. The network device may be any device having a wireless transceiver function, or a chip disposed in the device having the wireless transceiver function. The network device includes but is not limited to a base station (for example, a base station BS, a NodeB, an evolved NodeB (eNodeB or eNB), a gNodeB (gNB) in a fifth generation 5G communication system, a base station in a future communication system, an access node in a Wi-Fi system, a wireless relay node, or a wireless backhaul node) and the like. The base station may be a macro base station, a micro base station, a pico base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminal device are connected to a RAN node of a wireless network. Currently, some examples of the RAN node are a gNB, a transmission reception point (TRP), an evolved NodeB (evolved Node B, eNB), a radio network controller (RNC), a NodeB (Node B, NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node or a distributed unit (DU) node, or may be a RAN device including a CU node and a DU node.

The terminal devices 1 to 6 each are also referred to as user equipment (UE), a mobile station (MS), a mobile terminal (MT), a terminal, or the like, and each are a device that provides voice and/or data connectivity for a user, or a chip disposed in the device, for example, a handheld device or a vehicle-mounted device having a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, or a wireless terminal in a smart home. The terminal device provided in the embodiments of this application may be a low-complexity terminal device and/or a terminal device in a coverage enhancement mode A.

In this embodiment of this application, the base station and the UE 1 to the UE 6 form a communication system. In the communication system, the base station sends one or more of system information, a RAR message, and a paging message to one or more of the UE 1 to the UE 6. In addition, the UE 4 to the UE 6 also form a communication system. In the communication system, the UE 5 may function as a base station, and the UE 5 may send one or more of system information, control information, and a paging message to one or both of the UE 4 and the UE 6.

In the present disclosure, a TCI state not only refers to a TCI configuration behavior performed by the network device on the terminal device and configured content, but the TCI state may also refer to a case in which a demodulation reference signal (DMRS) port of a control channel or a data channel of the terminal device when the terminal device sends and receives data has a quasi co-location relationship with a specific reference signal. If the specific reference signal is a reference signal pointed by using the TCI state, the DMRS port of the control channel or the data channel of the terminal device when the terminal device sends and receives the data and the reference signal are quasi co-located.

In a current technology, a case in which a QCL relationship exists between a reference signal pointed by using a TCI state and an SSB defined in a cell can only be used in a case in which a terminal device initially accesses the cell and does not receive a command for activating the TCI state by using a MAC CE, but cannot be used in a case in which the terminal device has accessed the cell, because after the terminal device has accessed the cell, a transmit beam for the SSB may be different from scheduling of real data, or duration from last SSB measurement performed by the terminal device is excessively long. Therefore, a TCI state update solution provided in the current technology is not feasible. If a reference signal is determined based on the TCI state update solution in the current technology, data fails to be scheduled.

For example, in an NR technology, a terminal device works in a bandwidth part (BWP). From a perspective of a radio frequency, one frequency band in NR is divided into several BWPs, so that the terminal device may be configured by a network device to work in at least one BWP at a same time. The network device configures parameters related to a physical downlink control channel (PDCCH) and a physical downlink shared channel (PDSCH) in the BWP. In this case, beam information may be transmitted on different channels by using TCI states based on corresponding configured TCI states.

Therefore, to enable the terminal device to correctly send and receive information transmitted by the network device on the PDCCH and the PDSCH before the TCI state is activated by using a MAC CE, the terminal device generally assumes in advance that a receive beam is in a correspondence with a transmit beam of the network device, that is, the terminal device assumes in advance that a reference signal pointed by using the TCI state is the same as an SSB used when the terminal device initially accesses a cell.

However, after the terminal device initially accesses the cell, if BWP switching needs to be performed, before a TCI state configured by the network device for a new BWP is activated by using the MAC CE, the terminal device does not know a reference signal pointed by using the TCI state corresponding to the new BWP. In addition, because the reference signal pointed by using the TCI state during the initial cell access is time invalid or the terminal device does not store the reference signal. As a result, the terminal device cannot continue to use the reference signal pointed by using the TCI state during the initial cell access, and the terminal device cannot correctly send or receive corresponding information of the PDCCH and the PDSCH in the new BWP before the TCI state corresponding to the new BWP is activated.

To resolve the foregoing problem in the current technology, a new solution for updating a TCI state is provided in the embodiments of this application, to avoid a data receiving and sending failure caused by assuming that a reference signal pointed by using a TCI state is the same as an SSB used when a terminal device initially accesses a cell in the current technology.

Figure 2:
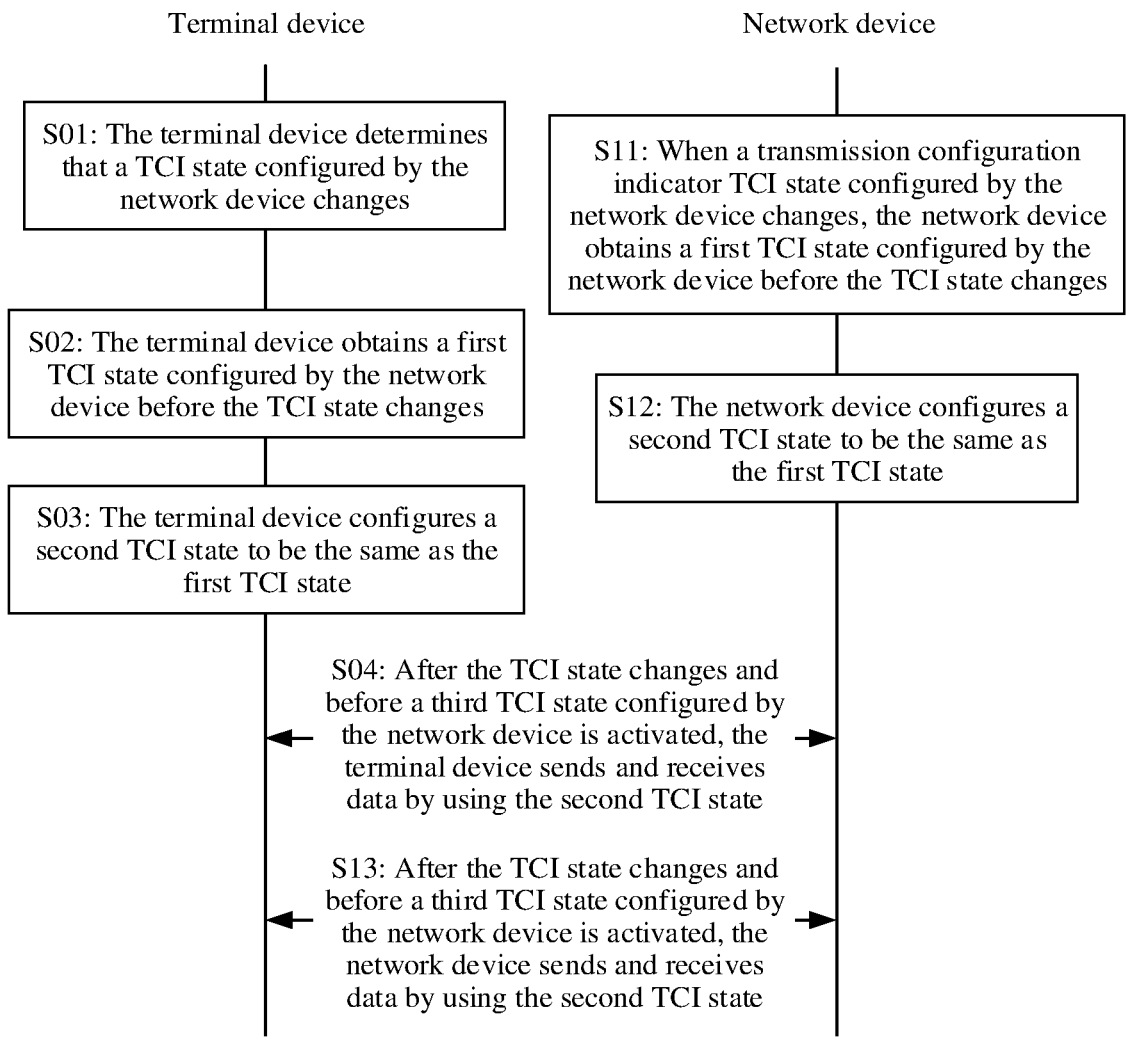
FIG. 2 is a schematic diagram of an interaction procedure between a network device, a terminal device, and a core network device according to an embodiment of this application.

The state configuration method provided in the embodiments of this application is applicable to a scenario in which a TCI state is updated. For example, the embodiments of this application are applicable to a scenario in which a TCI state changes due to uplink or downlink BWP switching of a terminal device. FIG. 2 is a schematic diagram of an interaction procedure between a network device and a terminal device according to an embodiment of this application. A state configuration method provided in this embodiment of this application mainly includes the following step S01 to step S04, and step S11 to step S13.

S01: The terminal device determines that a TCI state configured by the network device changes.

In this embodiment of this application, the TCI state configured by the network device is used to send and receive data between the terminal device and the network device. The terminal device first determines whether the TCI state configured by the network device changes. For example, when a beam used for data transmission between the terminal device and the network device changes, it may be considered that the TCI state configured by the network device changes. When the TCI state configured by the network device changes, the terminal device triggers execution of the following step S02. When the TCI state configured by the network device does not change, the terminal device does not perform the following step S02.

In this embodiment of this application, there are a plurality of cases in which the TCI state configured by the network device changes. For example, when the network device indicates the terminal device to switch an uplink BWP or a downlink BWP, the TCI state configured by the network device changes. For another example, in a secondary cell activation process of the terminal device, if the network device does not configure a TCI state for a channel state indicator-reference signal (CSI-RS) used for measuring a channel quality indicator (CQI) in a secondary cell, the network device needs to configure the TCI state for the CSI-RS. In this case, it may also be considered that the TCI state changes from not being configured to being configured. In embodiments, a specific situation of the change in the TCI state configured by the network device is not limited to the foregoing examples.

Figure 3A:
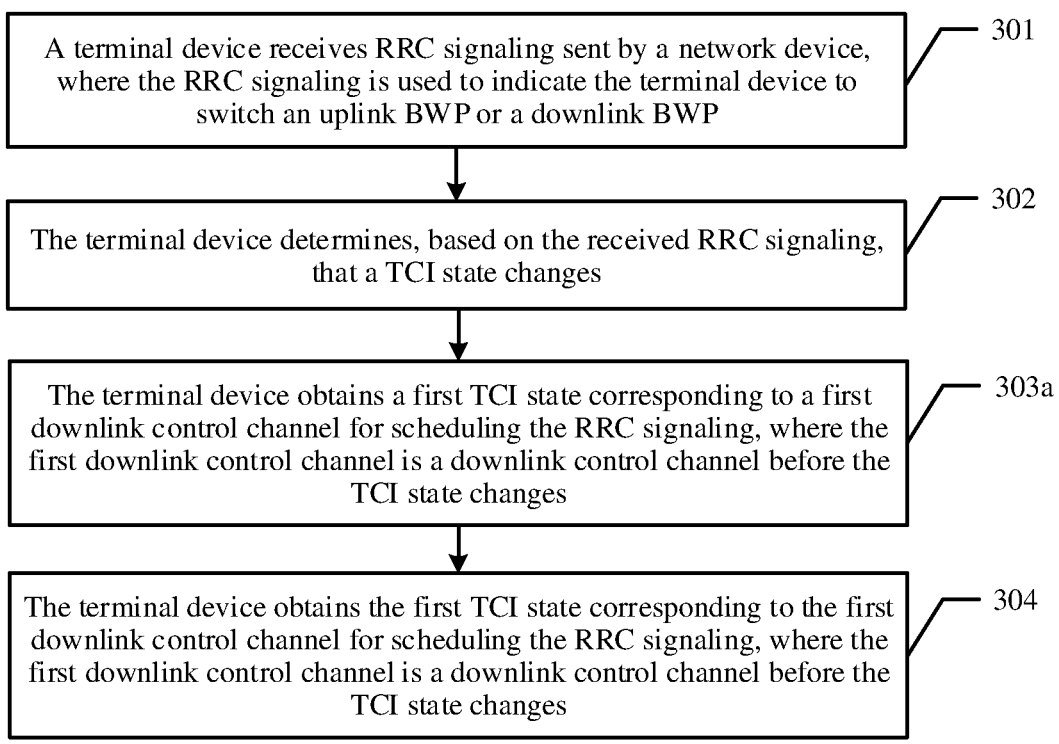
FIG. 3a is a schematic block flowchart of a state configuration method performed by a terminal device according to an embodiment of this application.
Figure 3B:
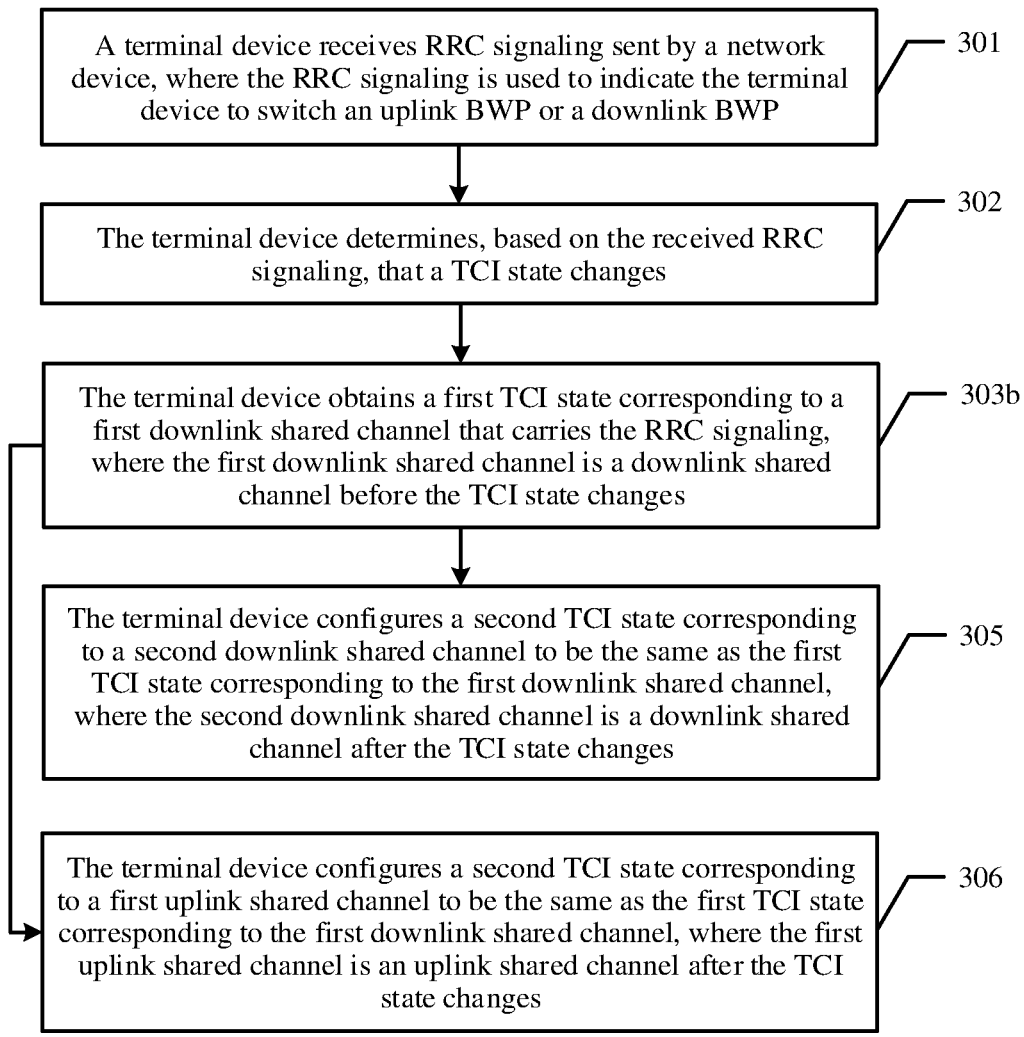
FIG. 3b is another schematic block flowchart of a state configuration method performed by a terminal device according to an embodiment of this application.

In some embodiments of this application, as shown in FIG. 3a and FIG. 3b, step S01 of determining, by the terminal device, that a TCI state configured by the network device changes includes:

301: The terminal device receives radio resource configuration (RRC) signaling sent by the network device, where the RRC signaling is used to indicate the terminal device to switch an uplink BWP or a downlink BWP, and the BWP switching causes the change in the TCI state configured by the network device.

302: The terminal device determines, based on the received RRC signaling, that the TCI state changes.

The network device may send the RRC signaling. The RRC signaling may trigger the terminal device to switch the BWP. When the BWP is switched, the TCI state configured by the network device changes. Therefore, if the terminal device receives the RRC signaling from the network device, the terminal device may determine, based on the RRC signaling, that the TCI state changes.

S02: The terminal device obtains a first TCI state configured by the network device before the TCI state changes.

In this embodiment of this application, when the terminal device determines that the TCI state configured by the network device changes, the terminal device first obtains the first TCI state. The first TCI state is a TCI state configured by the network device before the TCI state configured by the network device changes. For example, the first TCI state may be a TCI state last configured by the network device before the TCI state configured by the network device changes. When different TCI states change, first TCI states obtained by the terminal device are different. The following describes in detail the first TCI state obtained by the terminal device.

In some embodiments of this application, as shown in FIG. 3a, in a scenario in which the terminal device receives the RRC signaling from the network device, step S02 of obtaining, by the terminal device, a first TCI state configured by the network device before the TCI state changes includes:

303a: The terminal device obtains the first TCI state corresponding to a first downlink control channel for scheduling the RRC signaling, where the first downlink control channel is a downlink control channel before the TCI state changes.

The RRC signaling is scheduled by using the first downlink control channel. For example, the first downlink control channel may be specifically a physical downlink control channel (PDCCH). The first downlink control channel is a downlink control channel before the TCI state changes, and the terminal device determines a TCI state corresponding to the first downlink control channel as the first TCI state.

In some embodiments of this application, as shown in FIG. 3b, in a scenario in which the terminal device receives the RRC signaling from the network device, step S02 of obtaining, by the terminal device, a first TCI state configured by the network device before the TCI state changes includes:

303b: The terminal device obtains the first TCI state corresponding to a first downlink shared channel that carries the RRC signaling, where the first downlink shared channel is a downlink shared channel before the TCI state changes.

The RRC signaling may be carried on the first downlink shared channel. For example, the first downlink shared channel may be specifically a physical downlink shared channel (PDSCH). The first downlink shared channel is a downlink shared channel before the TCI state changes, and the terminal device determines a TCI state corresponding to the first downlink shared channel as the first TCI state.

S03: The terminal device configures a second TCI state to be the same as the first TCI state. When the second TCI state is the same as the first TCI state, a reference signal pointed by using the second TCI state and a reference signal pointed by using the first TCI state are quasi co-located.

In this embodiment of this application, the terminal device first obtains the first TCI state configured by the network device before the TCI state changes, and performs the same state configuration for the second TCI state based on the first TCI state. The second TCI state is a TCI state that can be used by the terminal device after the TCI state changes and before a third TCI state configured by the network device is activated. The reference signal pointed by using the second TCI state may be used by the terminal device and the network device to send and receive data.

In this embodiment of this application, that the second TCI state is the same as the first TCI state means that the reference signal pointed by using the second TCI state and the reference signal pointed by using the first TCI state are quasi co-located. That is, the reference signal pointed by using the second TCI state is configured based on the reference signal pointed by using the first TCI state. That a reference signal pointed by using the second TCI state and a reference signal pointed by using the first TCI state are quasi co-located may include: The reference signal pointed by using the second TCI state is the same as the reference signal pointed by using the first TCI state. For example, when configuring the reference signal pointed by using the second TCI state, the terminal device first obtains the reference signal, namely a reference signal ID #0, pointed by using the first TCI state. In this case, the terminal device may configure that the second TCI state also points to the reference signal ID #0. In this embodiment of this application, the second TCI state is configured to be the same as the first TCI state that is before the TCI state changes, so that a data transmission failure caused by configuring a current TCI state by using a reference signal used when the terminal device initially accesses a cell in a current technology is avoided. In this embodiment of this application, the reference signal pointed by using the second TCI state can be used to correctly send and receive data.

In some embodiments of this application, as shown in FIG. 3a, in a scenario in which the terminal device performs the foregoing step 303a, step S03 of configuring, by the terminal device, a second TCI state to be the same as the first TCI state includes:

304: The terminal device configures the second TCI state corresponding to a second downlink control channel to be the same as the first TCI state corresponding to the first downlink control channel, where the second downlink control channel is a downlink control channel after the TCI state changes.

The second downlink control channel is a downlink control channel after the TCI state changes, that is, the second downlink control channel is a downlink control channel that needs to be used by the terminal device before the third TCI state is activated. The terminal device configures the second TCI state corresponding to the second downlink control channel to be the same as the first TCI state corresponding to the first downlink control channel, that is, the terminal device continues to use the first TCI state corresponding to the first downlink control channel for scheduling the RRC signaling.

Further, in some embodiments of this application, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

After the TCI state configured by the network device changes, the terminal device may use a plurality of second downlink control channels. For example, the terminal device may use three second downlink control channels. All the second downlink control channels correspond to a same TCI state, that is, all the second downlink control channels correspond to the same second TCI state. It can be learned from the description of the foregoing embodiment that, because the second TCI state is the same as the first TCI state, when there are the plurality of second downlink control channels after the TCI state changes, the plurality of second downlink control channels continue to use the reference signal pointed by using the first TCI state to send and receive data. The same second TCI state is configured for the plurality of second downlink control channels, so that TCI state configurations for the plurality of second downlink control channels can be simplified, and data can be correctly sent and received on the plurality of second downlink control channels.

For example, BWP switching causes a change in a TCI state. After the BWP switching and before a new TCI state is activated, UE assumes that second TCI states corresponding to all downlink control channels are the same in a new BWP and point to a reference signal (RS) pointed by using the first TCI state.

In some other embodiments of this application, the quantity of downlink control channels remains unchanged before and after the TCI state changes. That is, the quantity of second downlink control channels is the same as the quantity of first downlink control channels. For example, if there are three first downlink control channels before the TCI state changes, there are also three second downlink control channels after the TCI state changes. The second downlink control channel and the first downlink control channel whose channel identifiers are the same correspond to the same TCI state, that is, the second downlink control channel and the first downlink control channel with the same channel identifier correspond to the same TCI state. Therefore, a TCI state configuration of the second downlink control channel can be simplified, and it can be ensured that data can be correctly sent and received on the second downlink control channel.

For example, BWP switching causes a change in a TCI state. Quantities of downlink control channels in all BWPs configured by the network device need to be the same, and TCI states of downlink control channels whose channel IDs are the same before and after the BWP switching are in a correspondence. In this case, after the BWP switching and before a new TCI state is activated, UE may assume that TCI states of corresponding downlink control channels are the same before and after the switching.

In some other embodiments of this application, before the TCI state configured by the network device changes, the terminal device may use a plurality of first downlink control channels. For example, the terminal device may use three first downlink control channels. When there are the plurality of first downlink control channels before the TCI state changes, the first downlink control channel corresponding to the first TCI state that is the same as the second TCI state is the predefined downlink control channel, that is, when there are the plurality of first downlink control channels, the first TCI state corresponding to the predefined downlink control channel may be used to configure the second TCI state.

For example, BWP switching causes a change in a TCI state. A second TCI state used after the BWP switching is the same as a TCI state of one of downlink control channels in an original BWP, and the downlink control channel may be a predefined downlink control channel or one of downlink control channels used by UE to receive RRC signaling. The predefined downlink control channel may be a downlink control channel corresponding to a physical layer 1 reception acknowledgment (L1 ACKnowledgment), or another downlink control channel having a predefined ID. For example, a PDCCH #0 is a predefined downlink control channel.

In some embodiments of this application, as shown in FIG. 3b, in a scenario in which the terminal device performs the foregoing step 303b, step S03 of configuring, by the terminal device, a second TCI state to be the same as the first TCI state includes:

305: The terminal device configures the second TCI state corresponding to a second downlink shared channel to be the same as the first TCI state corresponding to the first downlink shared channel, where the second downlink shared channel is a downlink shared channel after the TCI state changes.

Alternatively, 306: The terminal device configures the second TCI state corresponding to a first uplink shared channel to be the same as the first TCI state corresponding to the first downlink shared channel, where the first uplink shared channel is an uplink shared channel after the TCI state changes.

The second downlink shared channel is a downlink shared channel after the TCI state changes, that is, the second downlink shared channel is a downlink shared channel that needs to be used by the terminal device before the third TCI state is activated. The terminal device configures the second TCI state corresponding to the second downlink shared channel to be the same as the first TCI state corresponding to the first downlink shared channel, that is, the terminal device continues to use the first TCI state corresponding to the first downlink shared channel for scheduling the RRC signaling.

Configurations of the second TCI states corresponding to the PDCCH and the PDSCH used by the terminal device are described in the foregoing content. The following describes a configuration manner of the second TCI state corresponding to a physical uplink shared channel (PUSCH). For example, the first uplink shared channel is an uplink shared channel after the TCI state changes, that is, the first uplink shared channel is an uplink shared channel that needs to be used by the terminal device before the third TCI state is activated. The terminal device configures the second TCI state corresponding to the first uplink shared channel to be the same as the first TCI state corresponding to the first downlink shared channel, that is, the terminal device continues to use the first TCI state corresponding to the first downlink shared channel for scheduling the RRC signaling.

S04: After the TCI state changes and before the third TCI state configured by the network device is activated, the terminal device sends and receives data by using the second TCI state.

In this embodiment of this application, the first TCI state is a TCI state before the TCI state changes, and the third TCI state is a TCI state after the TCI state changes. Before the third TCI state is activated, in this embodiment of this application, the foregoing configured second TCI state may be used to send and receive data. Because the second TCI state is the same as the first TCI state, the terminal device continues to use the reference signal pointed by using the first TCI state that is before the TCI state changes, and the current technology is no longer used, so that it can be ensured that the terminal device can correctly send and receive data when using the second TCI state.

In the current technology, the reference signal pointed by using the TCI state when the TCI state changes is a reference signal used when the terminal device initially accesses a cell. In this embodiment of this application, a manner completely different from that in the current technology is used. That is, in this embodiment of this application, the second TCI state is configured based on the first TCI state configured by the network device before the TCI state changes. Before a new TCI state (namely, the third TCI state) is activated by the network device, the terminal device may continue to use an old TCI state (namely, the first TCI state) as a currently available TCI state (namely, the second TCI state). The reference signal pointed by using the old TCI state is more accurate and time-sensitive, so that data transmission performance is better, thereby ensuring correct sending and receiving of data.

The foregoing embodiments based on step S01 to step S04 describe how the terminal device configures the second TCI state and how the terminal device uses the second TCI state. The following describes, from a perspective of a network device side, how to configure the second TCI state and how to use the second TCI state. It may be understood that configuration and use of the TCI state by the network device are similar to those on a terminal device side. The network device and the terminal device can perform data sending and receiving with each other only when the network device and the terminal device use a same second TCI state configuration manner.

S11: When a TCI state configured by the network device changes, the network device obtains a first TCI state configured by the network device before the TCI state changes.

In this embodiment of this application, the TCI state configured by the network device is used to send and receive data between the terminal device and the network device. The network device first determines whether the TCI state configured by the network device changes. For example, when a beam used for data transmission between the terminal device and the network device changes, it may be considered that the TCI state configured by the network device changes. When the TCI state configured by the network device changes, the network device triggers execution of the following step S12. When the TCI state configured by the network device does not change, the network device does not perform the following step S12.

Figure 4A:
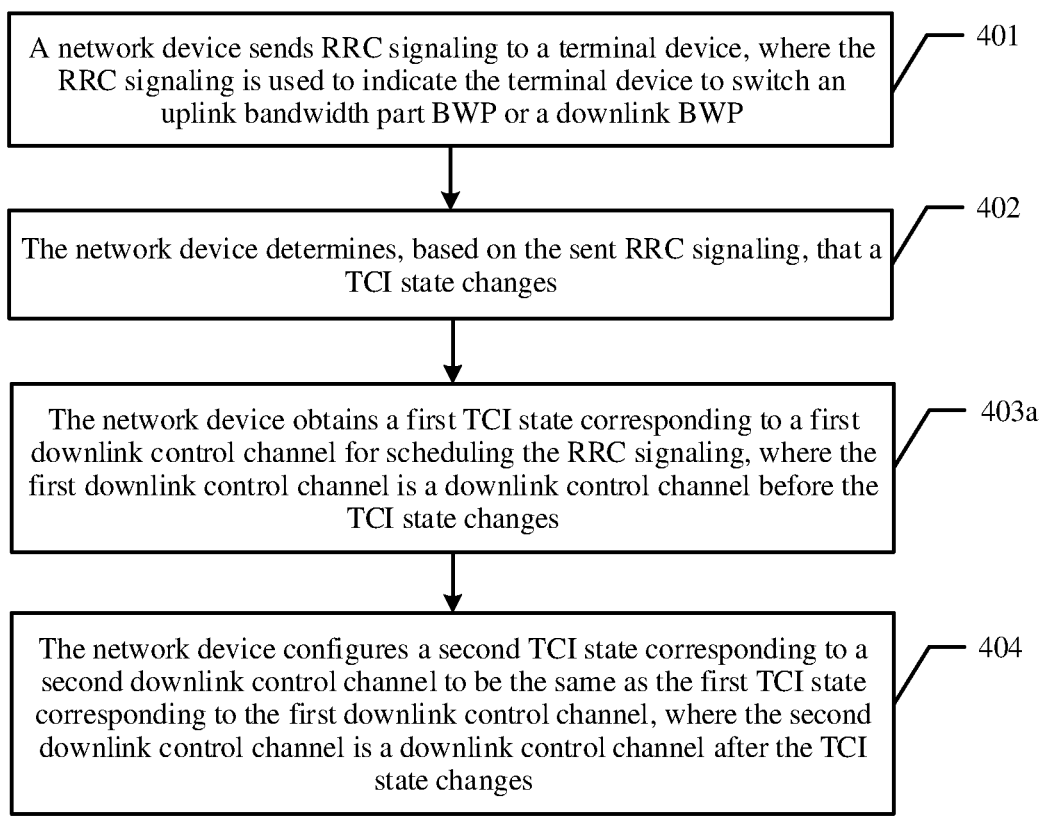
FIG. 4a is a schematic block flowchart of a state configuration method performed by a network device according to an embodiment of this application.
Figure 4B:
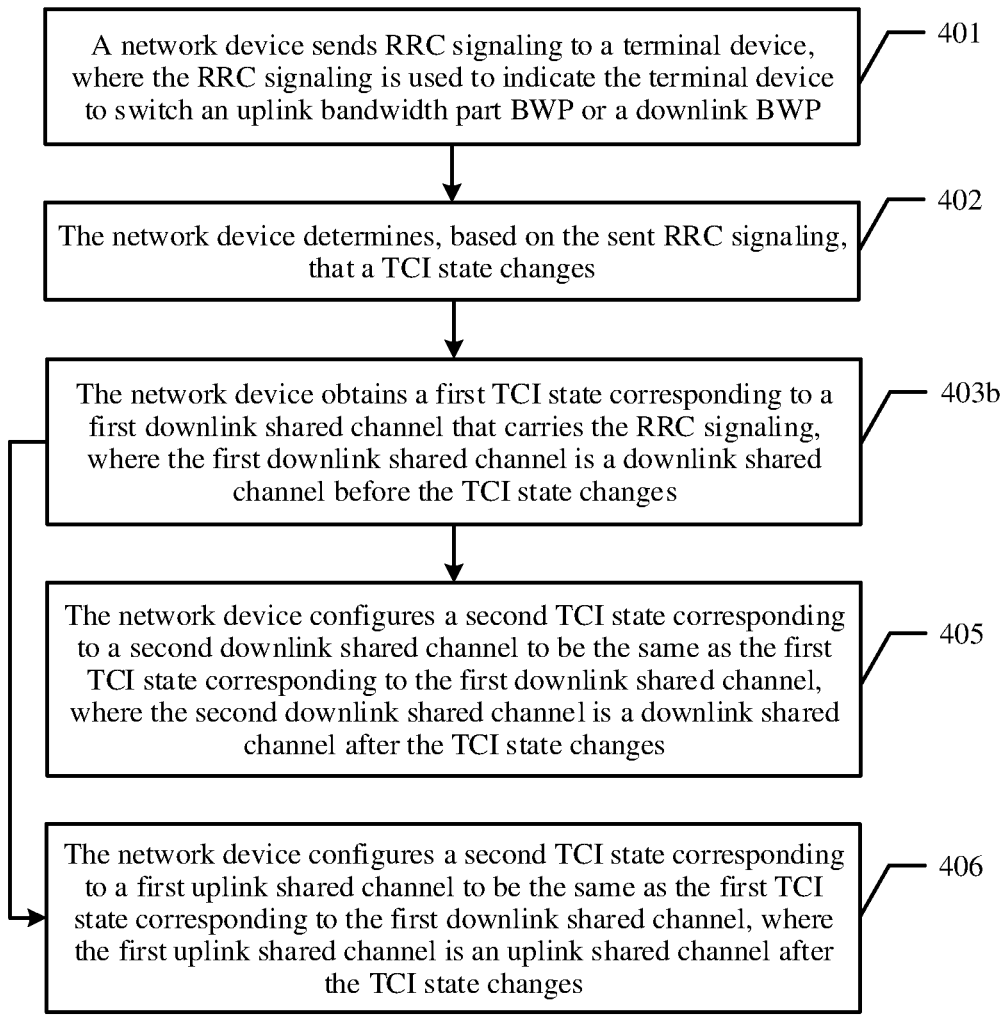
FIG. 4b is another schematic block flowchart of a state configuration method performed by a network device according to an embodiment of this application.

In some embodiments of this application, as shown in FIG. 4a and FIG. 4b, determining, by the network device, that the TCI state configured by the network device changes in step S11 includes:

401: The network device sends RRC signaling to the terminal device, where the RRC signaling is used to indicate the terminal device to switch an uplink bandwidth part BWP or a downlink BWP, and the BWP switching causes the change in the TCI state configured by the network device.

402: The network device determines, based on the sent RRC signaling, that the TCI state changes.

The network device may send the RRC signaling. The RRC signaling may trigger the terminal device to switch the BWP. When the BWP is switched, the TCI state configured by the network device changes. Therefore, if the network device sends the RRC signaling to the terminal device, the network device may determine, based on the RRC signaling, that the TCI state changes.

In this embodiment of this application, when the network device determines that the TCI state configured by the network device changes, the network device first obtains the first TCI state. The first TCI state is a TCI state configured by the network device before the TCI state configured by the network device changes. For example, the first TCI state may be a TCI state last configured by the network device before the TCI state configured by the network device changes. When different TCI states change, first TCI states obtained by the network device are different. The following describes in detail the first TCI state obtained by the network device.

In some embodiments of this application, as shown in FIG. 4a, in a scenario in which the network device sends the RRC signaling to the terminal device, step S11 of obtaining, by the network device, a first TCI state configured by the network device before the TCI state changes includes:

403a: The network device obtains the first TCI state corresponding to a first downlink control channel for scheduling the RRC signaling, where the first downlink control channel is a downlink control channel before the TCI state changes.

The RRC signaling is scheduled by using the first downlink control channel. For example, the first downlink control channel may be specifically a PDCCH. The first downlink control channel is a downlink control channel before the TCI state changes, and the network device determines a TCI state corresponding to the first downlink control channel as the first TCI state.

In some embodiments of this application, as shown in FIG. 4b, in a scenario in which the network device sends the RRC signaling to the terminal device, step S11 of obtaining, by the network device, a first TCI state configured by the network device before the TCI state changes includes:

403b: The network device obtains the first TCI state corresponding to a first downlink shared channel that carries the RRC signaling, where the first downlink shared channel is a downlink shared channel before the TCI state changes.

The RRC signaling may be carried on the first downlink shared channel. For example, the first downlink shared channel may be specifically a PDSCH. The first downlink shared channel is a downlink shared channel before the TCI state changes, and the network device determines a TCI state corresponding to the first downlink shared channel as the first TCI state.

S12: The network device configures a second TCI state to be the same as the first TCI state. When the second TCI state is the same as the first TCI state, a reference signal pointed by using the second TCI state and a reference signal pointed by using the first TCI state are quasi co-located.

In this embodiment of this application, the network device first obtains the first TCI state configured by the network device before the TCI state changes, and performs the same state configuration for the second TCI state based on the first TCI state. The second TCI state is a TCI state that can be used by the network device after the TCI state changes and before a third TCI state configured by the network device is activated. The reference signal pointed by using the second TCI state may be used by the network device and the terminal device to send and receive data.

In this embodiment of this application, that the second TCI state is the same as the first TCI state means that the reference signal pointed by using the second TCI state and the reference signal pointed by using the first TCI state are quasi co-located. That is, the reference signal pointed by using the second TCI state is configured based on the reference signal pointed by using the first TCI state. That a reference signal pointed by using the second TCI state and a reference signal pointed by using the first TCI state are quasi co-located may include: The reference signal pointed by using the second TCI state is the same as the reference signal pointed by using the first TCI state. For example, when configuring the reference signal pointed by using the second TCI state, the network device first obtains the reference signal, namely a reference signal ID #0, pointed by using the first TCI state. In this case, the network device may configure that the second TCI state also points to the reference signal ID #0. In this embodiment of this application, the second TCI state is configured to be the same as the first TCI state that is before the TCI state changes, so that a data transmission failure caused by configuring a current TCI state by using a reference signal used when the network device initially accesses a cell in a current technology is changed. In this embodiment of this application, the reference signal pointed by using the second TCI state can be used to correctly send and receive data.

In some embodiments of this application, as shown in FIG. 4a, in a scenario in which the network device performs the foregoing step 403a, step S12 of configuring, by the network device, a second TCI state to be the same as the first TCI state includes:

404: The network device configures the second TCI state corresponding to a second downlink control channel to be the same as the first TCI state corresponding to the first downlink control channel, where the second downlink control channel is a downlink control channel after the TCI state changes.

The second downlink control channel is a downlink control channel after the TCI state changes, that is, the second downlink control channel is a downlink control channel that needs to be used by the terminal device before the third TCI state is activated. The network device configures the second TCI state corresponding to the second downlink control channel to be the same as the first TCI state corresponding to the first downlink control channel, that is, the network device continues to use the first TCI state corresponding to the first downlink control channel for scheduling the RRC signaling.

Further, in some embodiments of this application, when there are a plurality of second downlink control channels after the TCI state changes, second TCI states corresponding to all the second downlink control channels are the same; or
a quantity of second downlink control channels and a quantity of first downlink control channels are the same, and a second downlink control channel and a first downlink control channel whose channel identifiers are the same correspond to a same TCI state; or
when there are a plurality of first downlink control channels before the TCI state changes, the first downlink control channel corresponding to the first TCI state that is the same as the second TCI state is a predefined downlink control channel.

After the TCI state configured by the network device changes, the network device may use a plurality of second downlink control channels. For example, the network device may use three second downlink control channels. All the second downlink control channels correspond to a same TCI state, that is, all the second downlink control channels correspond to the same second TCI state. It can be learned from the description of the foregoing embodiment that, because the second TCI state is the same as the first TCI state, when there are the plurality of second downlink control channels after the TCI state changes, the plurality of second downlink control channels continue to use the reference signal pointed by using the first TCI state to send and receive data. The same second TCI state is configured for the plurality of second downlink control channels, so that TCI state configurations for the plurality of second downlink control channels can be simplified, and data can be correctly sent and received on the plurality of second downlink control channels.

For example, BWP switching causes a change in a TCI state. After the BWP switching and before a new TCI state is activated, UE assumes that second TCI states corresponding to all downlink control channels are the same in a new BWP and point to a reference signal (RS) pointed by using the first TCI state.

In some other embodiments of this application, the quantity of downlink control channels remains unchanged before and after the TCI state changes. That is, the quantity of second downlink control channels is the same as the quantity of first downlink control channels. For example, if there are three first downlink control channels before the TCI state changes, there are also three second downlink control channels after the TCI state changes. The second downlink control channel and the first downlink control channel whose channel identifiers are the same correspond to the same TCI state, that is, the second downlink control channel and the first downlink control channel with the same channel identifier correspond to the same TCI state. Therefore, a TCI state configuration of the second downlink control channel can be simplified, and it can be ensured that data can be correctly sent and received on the second downlink control channel.

For example, BWP switching causes a change in a TCI state. Quantities of downlink control channels in all BWPs configured by the network device need to be the same, and TCI states of downlink control channels whose channel IDs are the same before and after the BWP switching are in a correspondence. In this case, after the BWP switching and before anew TCI state is activated, UE may assume that TCI states of corresponding downlink control channels are the same before and after the switching.

In some other embodiments of this application, before the TCI state configured by the network device changes, the network device may use a plurality of first downlink control channels. For example, the network device may use three first downlink control channels. When there are the plurality of first downlink control channels before the TCI state changes, the first downlink control channel corresponding to the first TCI state that is the same as the second TCI state is the predefined downlink control channel, that is, when there are the plurality of first downlink control channels, the first TCI state corresponding to the predefined downlink control channel may be used to configure the second TCI state.

For example, BWP switching causes a change in a TCI state. A second TCI state used after the BWP switching is the same as a TCI state of one of downlink control channels in an original BWP, and the downlink control channel may be a predefined downlink control channel or one of downlink control channels used by UE to receive RRC signaling. The predefined downlink control channel may be a downlink control channel corresponding to a physical layer 1 reception acknowledgment (L1 ACKnowledgment), or another downlink control channel having a predefined ID. For example, a PDCCH #0 is a predefined downlink control channel.

In some embodiments of this application, as shown in FIG. 4b, in a scenario in which the network device performs the foregoing step 403b, step S12 of configuring, by the network device, a second TCI state to be the same as the first TCI state includes:

405: The network device configures the second TCI state corresponding to a second downlink shared channel to be the same as the first TCI state corresponding to the first downlink shared channel, where the second downlink shared channel is a downlink shared channel after the TCI state changes.

Alternatively, 406: The network device configures the second TCI state corresponding to a first uplink shared channel to be the same as the first TCI state corresponding to the first downlink shared channel, where the first uplink shared channel is an uplink shared channel after the TCI state changes.

The second downlink shared channel is a downlink shared channel after the TCI state changes, that is, the second downlink shared channel is a downlink shared channel that needs to be used by the network device before the third TCI state is activated. The network device configures the second TCI state corresponding to the second downlink shared channel to be the same as the first TCI state corresponding to the first downlink shared channel, that is, the network device continues to use the first TCI state corresponding to the first downlink shared channel for scheduling the RRC signaling.

Configurations of the second TCI states corresponding to the PDCCH and the PDSCH used by the network device are described in the foregoing content. The following describes a configuration manner of the second TCI state corresponding to a PUSCH. For example, the first uplink shared channel is an uplink shared channel after the TCI state changes, that is, the first uplink shared channel is an uplink shared channel that needs to be used by the network device before the third TCI state is activated. The network device configures the second TCI state corresponding to the first uplink shared channel to be the same as the first TCI state corresponding to the first downlink shared channel, that is, the network device continues to use the first TCI state corresponding to the first downlink shared channel for scheduling the RRC signaling.

S13: After the TCI state changes and before the third TCI state configured by the network device is activated, the network device sends and receives data by using the second TCI state.

In this embodiment of this application, the first TCI state is a TCI state before the TCI state changes, and the third TCI state is a TCI state after the TCI state changes. Before the third TCI state is activated, in this embodiment of this application, the foregoing configured second TCI state may be used to send and receive data. Because the second TCI state is the same as the first TCI state, the network device continues to use the reference signal pointed by using the first TCI state that is before the TCI state changes, and the current technology is no longer used, so that it can be ensured that the network device can correctly send and receive data when using the second TCI state.

It should be noted that step S01 to step S04 are performed by the terminal device, and subsequent step S11 to step S13 are performed by the network device. There is no sequence association between the steps of the method performed by the terminal device and the steps of the method performed by the network device.

It can be learned from the description of the example in the foregoing embodiment that, in this embodiment of this application, the second TCI state is configured based on the first TCI state configured by the network device before the TCI state changes. Before a new TCI state (namely, the third TCI state) is activated by the network device, the network device may continue to use an old TCI state (namely, the first TCI state) as a currently available TCI state (namely, the second TCI state). The reference signal pointed by using the old TCI state is more accurate and time-sensitive, so that data transmission performance is better, thereby ensuring correct sending and receiving of data.

In the foregoing embodiment, the example in which the network device sends the RRC signaling to trigger the BWP switching, to cause the change in the TCI state is used. The following provides description by using an example in which the network device sends downlink control information (DCI) to trigger the BWP switching, to cause the change in the TCI state. First, description is provided from a perspective of the terminal device side.

Figure 5A:
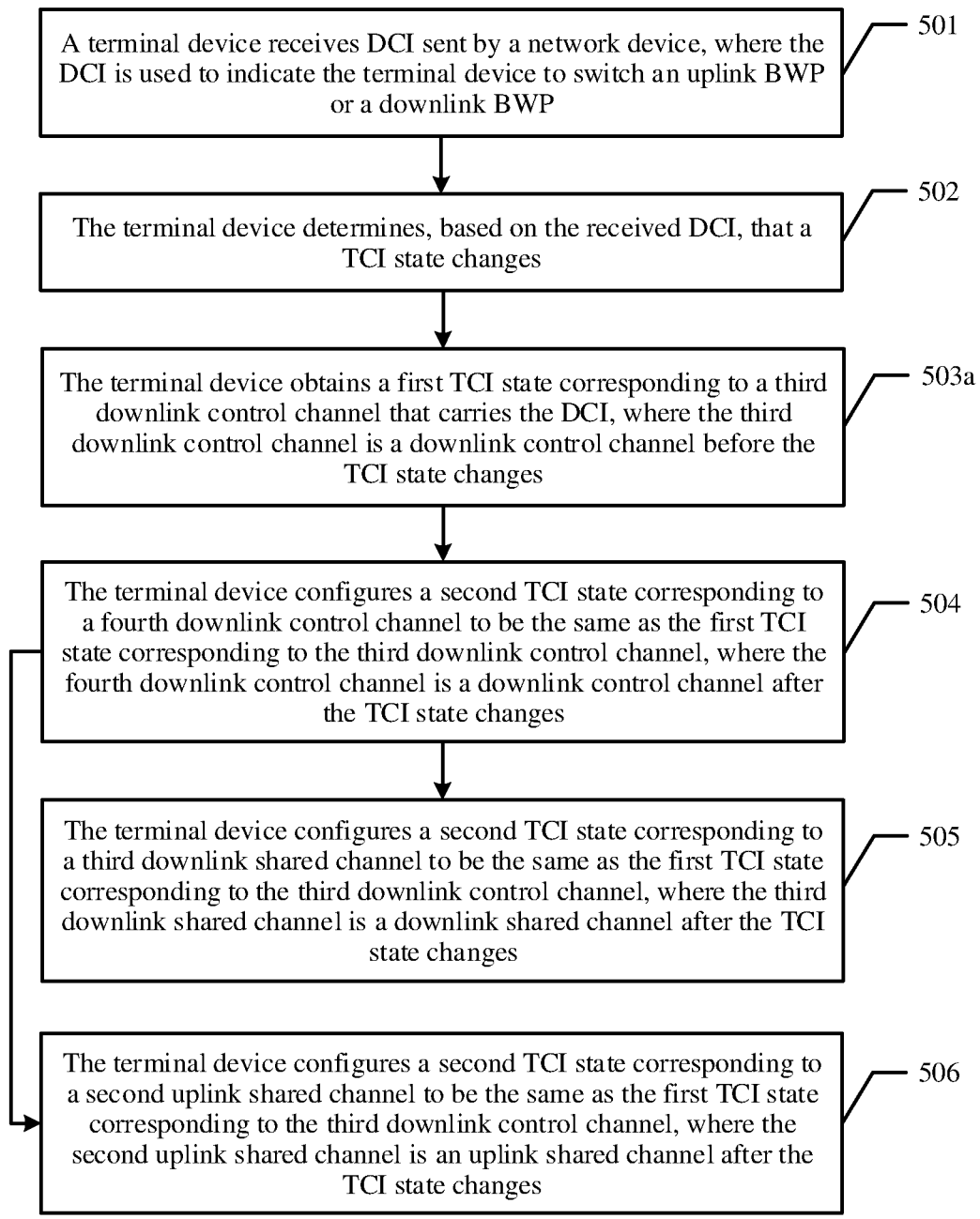
FIG. 5a is another schematic block flowchart of a state configuration method performed by a terminal device according to an embodiment of this application.
Figure 5B:
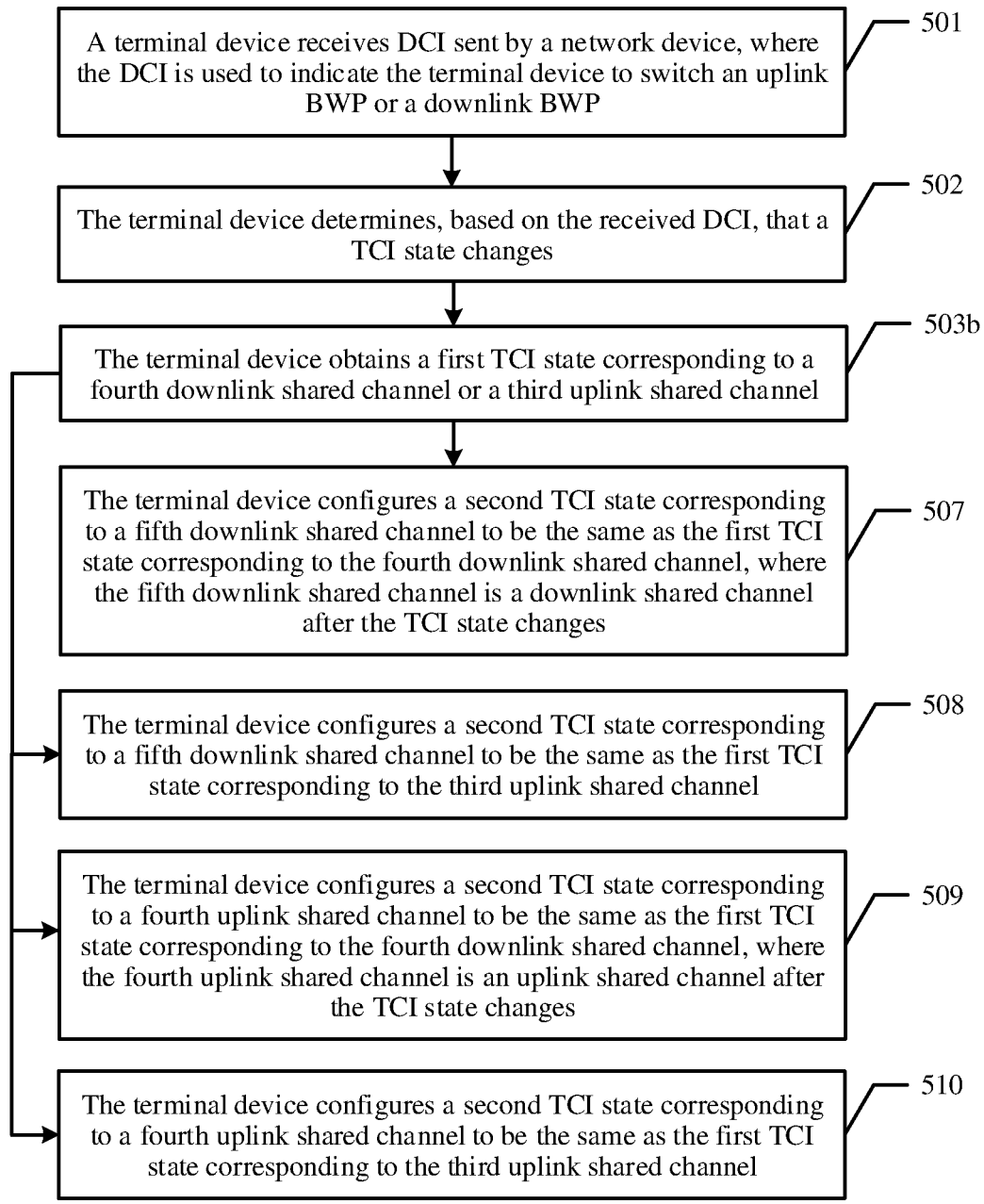
FIG. 5b is another schematic block flowchart of a state configuration method performed by a terminal device according to an embodiment of this application.

In some embodiments of this application, as shown in FIG. 5a and FIG. 5b, step S01 of determining, by the terminal device, that a TCI state configured by the network device changes includes:

501: The terminal device receives DCI sent by the network device, where the DCI is used to indicate the terminal device to switch an uplink BWP or a downlink BWP, and the BWP switching causes the change in the TCI state configured by the network device.

502: The terminal device determines, based on the received DCI, that the TCI state changes.

The network device may send the DCI. The DCI may trigger the terminal device to switch the BWP. When the BWP is switched, the TCI state configured by the network device changes. Therefore, if the terminal device receives the DCI from the network device, the terminal device may determine, based on the DCI, that the TCI state changes. For example, the network device sends the DCI to the terminal device, where a DCI format used for the DCI is 0_1 or 1_1, to indicate the terminal device to switch to another BWP to work.

In some embodiments of this application, as shown in FIG. 5a, step S02 of obtaining, by the terminal device, a first TCI state configured by the network device before the TCI state changes includes:

503a: The terminal device obtains the first TCI state corresponding to a third downlink control channel that carries the DCI, where the third downlink control channel is a downlink control channel before the TCI state changes.

The DCI is carried on the third downlink control channel. For example, the third downlink control channel may be specifically a PDCCH. The third downlink control channel is a downlink control channel before the TCI state changes, and the terminal device determines a TCI state corresponding to the third downlink control channel as the first TCI state.

In some embodiments of this application, as shown in FIG. 5a, step S03 of configuring, by the terminal device, a second TCI state to be the same as the first TCI state includes:

504: The terminal device configures the second TCI state corresponding to a fourth downlink control channel to be the same as the first TCI state corresponding to the third downlink control channel, where the fourth downlink control channel is a downlink control channel after the TCI state changes.

The fourth downlink control channel is a downlink control channel after the TCI state changes, that is, the fourth downlink control channel is a downlink control channel that needs to be used by the terminal device before the third TCI state is activated. The terminal device configures the second TCI state corresponding to the fourth downlink control channel to be the same as the first TCI state corresponding to the third downlink control channel, that is, the terminal device continues to use the first TCI state corresponding to the third downlink control channel for scheduling the RRC signaling.

Further, in some embodiments of this application, when there are a plurality of fourth downlink control channels after the TCI state changes, second TCI states corresponding to all the fourth downlink control channels are the same; or a quantity of fourth downlink control channels and a quantity of third downlink control channels are the same, and a fourth downlink control channel and a third downlink control channel whose channel identifiers are the same correspond to a same TCI state; or when there are a plurality of third downlink control channels after the TCI state changes, the third downlink control channel corresponding to the first TCI state that is the same as the second TCI state is a predefined downlink control channel.

The description of the fourth downlink control channel may be analogous to the description of the foregoing second downlink control channel. The third downlink control channel herein may be analogous to the description of the foregoing first downlink control channel.

In some embodiments of this application, as shown in FIG. 5a, step S03 of configuring, by the terminal device, a second TCI state to be the same as the first TCI state includes:

505: The terminal device configures the second TCI state corresponding to a third downlink shared channel to be the same as the first TCI state corresponding to the third downlink control channel, where the third downlink shared channel is a downlink shared channel after the TCI state changes.

Alternatively, 506: The terminal device configures the second TCI state corresponding to a second uplink shared channel to be the same as the first TCI state corresponding to the third downlink control channel, where the second uplink shared channel is an uplink shared channel after the TCI state changes.

The third downlink shared channel is a downlink shared channel after the TCI state changes, that is, the third downlink shared channel is a downlink shared channel that needs to be used by the terminal device before the third TCI state is activated. The terminal device configures the second TCI state corresponding to the third downlink shared channel to be the same as the first TCI state corresponding to the third downlink control channel, that is, the terminal device continues to use the first TCI state corresponding to the third downlink control channel for scheduling the RRC signaling.

Configurations of the second TCI states corresponding to the PDCCH and the PDSCH used by the terminal device are described in the foregoing content. The following describes a configuration manner of the second TCI state corresponding to a PUSCH. For example, the second uplink shared channel is an uplink shared channel after the TCI state changes, that is, the second uplink shared channel is an uplink shared channel that needs to be used by the terminal device before the third TCI state is activated. The terminal device configures the second TCI state corresponding to the second uplink shared channel to be the same as the first TCI state corresponding to the third downlink control channel, that is, the terminal device continues to use the first TCI state corresponding to the third downlink control channel for scheduling the RRC signaling.

In some embodiments of this application, as shown in FIG. 5b, step S02 of obtaining, by the terminal device, a first TCI state configured by the network device before the TCI state changes includes:

503b: The terminal device obtains the first TCI state corresponding to a fourth downlink shared channel or a third uplink shared channel, where the fourth downlink shared channel is a downlink shared channel before the DCI is received, and the third uplink shared channel is an uplink shared channel before the DCI is received.

The first TCI state obtained by the terminal device may correspond to the fourth downlink shared channel, or the first TCI state may correspond to the third uplink shared channel.

In some embodiments of this application, as shown in FIG. 5b, step S03 of configuring, by the terminal device, a second TCI state to be the same as the first TCI state includes:

507: The terminal device configures the second TCI state corresponding to a fifth downlink shared channel to be the same as the first TCI state corresponding to the fourth downlink shared channel, where the fifth downlink shared channel is a downlink shared channel after the TCI state changes.

Alternatively, 508: The terminal device configures the second TCI state corresponding to a fifth downlink shared channel to be the same as the first TCI state corresponding to the third uplink shared channel.

Alternatively, 509: The terminal device configures the second TCI state corresponding to a fourth uplink shared channel to be the same as the first TCI state corresponding to the fourth downlink shared channel, where the fourth uplink shared channel is an uplink shared channel after the TCI state changes.

Alternatively, 510: The terminal device configures the second TCI state corresponding to a fourth uplink shared channel to be the same as the first TCI state corresponding to the third uplink shared channel.

The fifth downlink shared channel is a downlink shared channel after the TCI state changes. The second TCI state corresponding to the fifth downlink shared channel may be configured based on the first TCI state corresponding to the fourth downlink shared channel. Alternatively, the second TCI state corresponding to the fifth downlink shared channel may be configured based on the first TCI state corresponding to the third uplink shared channel. Similarly, the fourth uplink shared channel is an uplink shared channel after the TCI state changes. The second TCI state corresponding to the fourth uplink shared channel may be configured based on the first TCI state corresponding to the fourth downlink shared channel. Alternatively, the second TCI state corresponding to the fourth uplink shared channel may be configured based on the first TCI state corresponding to the third uplink shared channel. Therefore, in this embodiment of this application, the terminal device may both configure the second TCI state corresponding to the fifth downlink shared channel and configure the second TCI state corresponding to the fourth uplink shared channel by continuing to use the first TCI state configured by the network device before the TCI state changes. Therefore, it is ensured that data can be correctly sent and received on the fifth downlink shared channel and the fourth uplink shared channel.

In the foregoing embodiment, description is provided by using the example in which the terminal device receives the DCI sent by the network device to trigger the BWP switching, to cause the change in the TCI state. The following provides description from the perspective of the network device side.

Figure 6A:
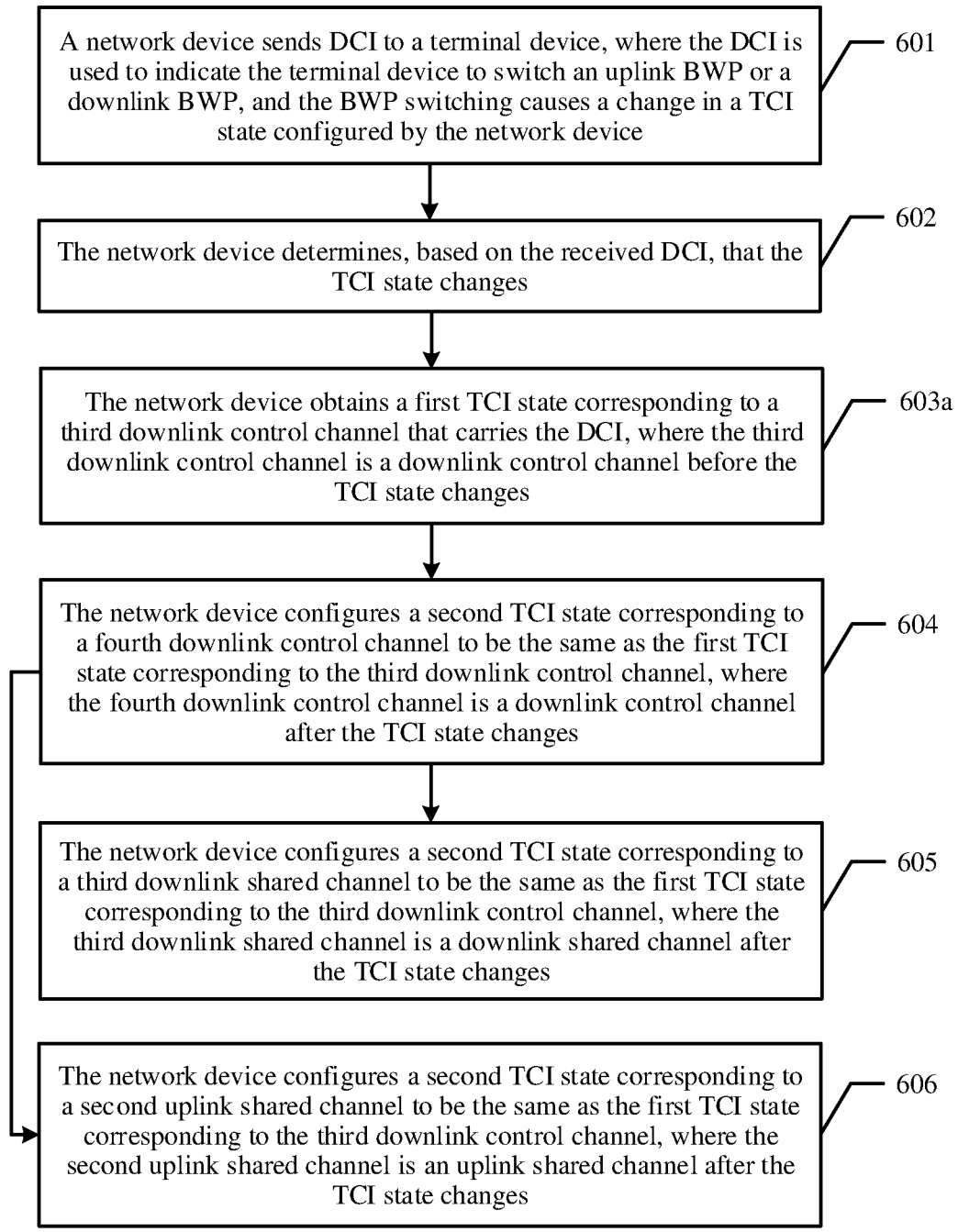
FIG. 6a is another schematic block flowchart of a state configuration method performed by a network device according to an embodiment of this application.
Figure 6B:
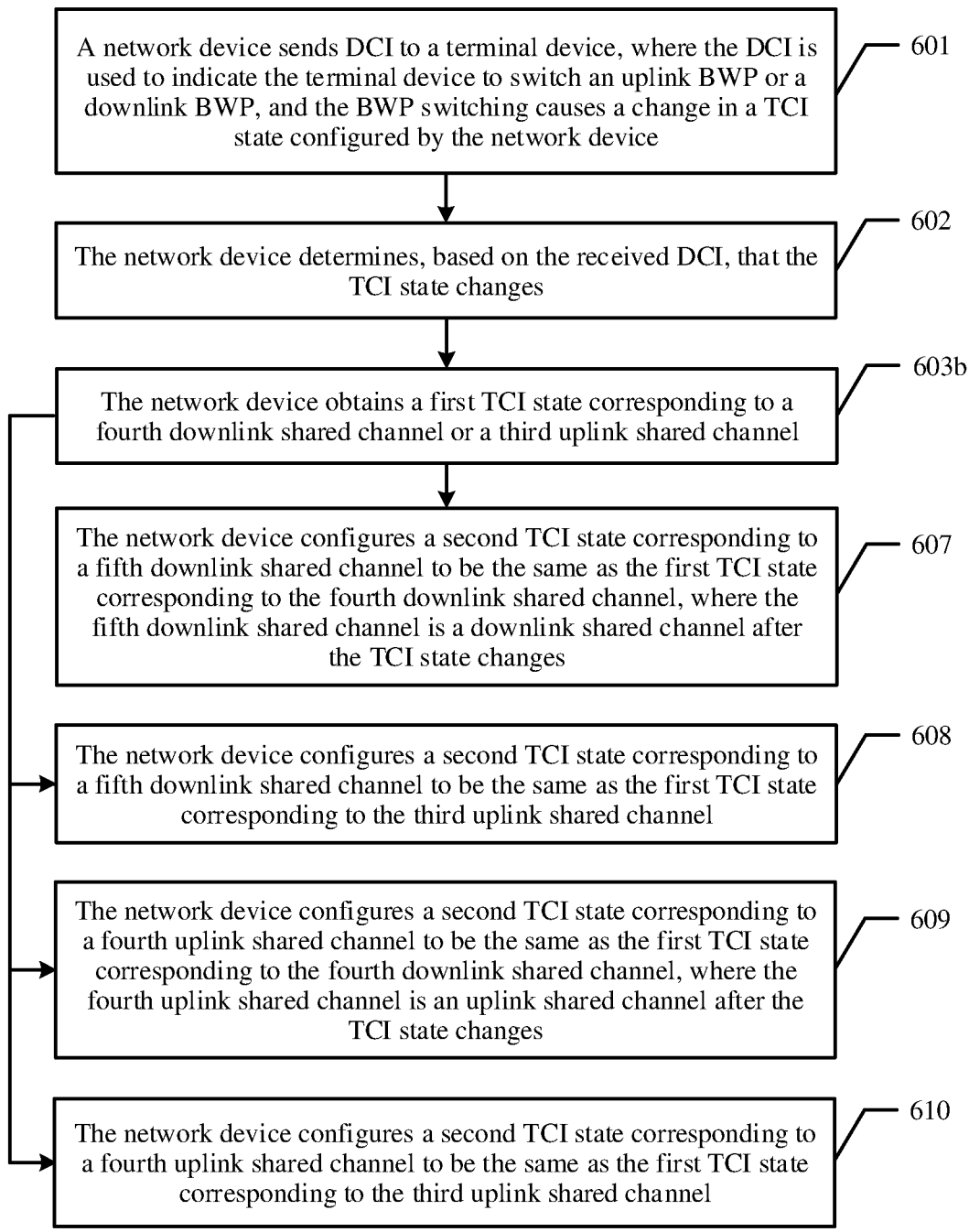
FIG. 6b is another schematic block flowchart of a state configuration method performed by a network device according to an embodiment of this application.

In some embodiments of this application, as shown in FIG. 6a and FIG. 6b, step S11 of determining, by the network device, that the TCI state configured by the network device changes includes:

601: The network device sends DCI to the terminal device, where the DCI is used to indicate the terminal device to switch an uplink BWP or a downlink BWP, and the BWP switching causes the change in the TCI state configured by the network device.

602: The network device determines, based on the received DCI, that the TCI state changes.

The network device may send the DCI. The DCI may trigger the terminal device to switch the BWP. When the BWP is switched, the TCI state configured by the network device changes. Therefore, if the network device sends the DCI to the terminal device, the network device may determine, based on the DCI, that the TCI state changes. For example, the network device sends the DCI to the terminal device, where a DCI format used for the DCI is 0_1 or 1_1, to indicate the terminal device to switch to another BWP to work.

In some embodiments of this application, as shown in FIG. 6a, step S11 of obtaining, by the network device, a first TCI state configured by the network device before the TCI state changes includes:

603a: The network device obtains the first TCI state corresponding to a third downlink control channel that carries the DCI, where the third downlink control channel is a downlink control channel before the TCI state changes.

The DCI is carried on the third downlink control channel. For example, the third downlink control channel may be specifically a PDCCH. The third downlink control channel is a downlink control channel before the TCI state changes, and the network device determines a TCI state corresponding to the third downlink control channel as the first TCI state.

In some embodiments of this application, as shown in FIG. 6a, step S12 of configuring, by the network device, a second TCI state to be the same as the first TCI state includes:

604: The network device configures the second TCI state corresponding to a fourth downlink control channel to be the same as the first TCI state corresponding to the third downlink control channel, where the fourth downlink control channel is a downlink control channel after the TCI state changes.

The fourth downlink control channel is a downlink control channel after the TCI state changes, that is, the fourth downlink control channel is a downlink control channel that needs to be used by the network device before the third TCI state is activated. The network device configures the second TCI state corresponding to the fourth downlink control channel to be the same as the first TCI state corresponding to the third downlink control channel, that is, the network device continues to use the first TCI state corresponding to the third downlink control channel for scheduling the RRC signaling.

Further, in some embodiments of this application, when there are a plurality of fourth downlink control channels after the TCI state changes, second TCI states corresponding to all the fourth downlink control channels are the same; or
- a quantity of fourth downlink control channels and a quantity of third downlink control channels are the same, and a fourth downlink control channel and a third downlink control channel whose channel identifiers are the same correspond to a same TCI state; or
- when there are a plurality of third downlink control channels after the TCI state changes, the third downlink control channel corresponding to the first TCI state that is the same as the second TCI state is a predefined downlink control channel.

The description of the fourth downlink control channel may be analogous to the description of the foregoing second downlink control channel. The third downlink control channel herein may be analogous to the description of the foregoing first downlink control channel.

In some embodiments of this application, as shown in FIG. 6a, step S12 of configuring, by the network device, a second TCI state to be the same as the first TCI state includes:

605: The network device configures the second TCI state corresponding to a third downlink shared channel to be the same as the first TCI state corresponding to the third downlink control channel, where the third downlink shared channel is a downlink shared channel after the TCI state changes.

Alternatively, 606: The network device configures the second TCI state corresponding to a second uplink shared channel to be the same as the first TCI state corresponding to the third downlink control channel, where the second uplink shared channel is an uplink shared channel after the TCI state changes.

The third downlink shared channel is a downlink shared channel after the TCI state changes, that is, the third downlink shared channel is a downlink shared channel that needs to be used by the network device before the third TCI state is activated. The network device configures the second TCI state corresponding to the third downlink shared channel to be the same as the first TCI state corresponding to the third downlink control channel, that is, the network device continues to use the first TCI state corresponding to the third downlink control channel for scheduling the RRC signaling.

Configurations of the second TCI states corresponding to the PDCCH and the PDSCH used by the network device are described in the foregoing content. The following describes a configuration manner of the second TCI state corresponding to a PUSCH. For example, the second uplink shared channel is an uplink shared channel after the TCI state changes, that is, the second uplink shared channel is an uplink shared channel that needs to be used by the network device before the third TCI state is activated. The network device configures the second TCI state corresponding to the second uplink shared channel to be the same as the first TCI state corresponding to the third downlink control channel, that is, the network device continues to use the first TCI state corresponding to the third downlink control channel for scheduling the RRC signaling.

In some embodiments of this application, as shown in FIG. 6b, step S11 of obtaining, by the network device, a first TCI state configured by the network device before the TCI state changes includes:

603b: The network device obtains the first TCI state corresponding to a fourth downlink shared channel or a third uplink shared channel, where the fourth downlink shared channel is a downlink shared channel before the DCI is received, and the third uplink shared channel is an uplink shared channel before the DCI is received.

The first TCI state obtained by the network device may correspond to the fourth downlink shared channel, or the first TCI state may correspond to the third uplink shared channel.

In some embodiments of this application, as shown in FIG. 6b, step S12 of configuring, by the network device, a second TCI state to be the same as the first TCI state includes:

607: The network device configures the second TCI state corresponding to a fifth downlink shared channel to be the same as the first TCI state corresponding to the fourth downlink shared channel, where the fifth downlink shared channel is a downlink shared channel after the TCI state changes.

Alternatively, 608: The network device configures the second TCI state corresponding to a fifth downlink shared channel to be the same as the first TCI state corresponding to the third uplink shared channel.

Alternatively, 609: The network device configures the second TCI state corresponding to a fourth uplink shared channel to be the same as the first TCI state corresponding to the fourth downlink shared channel, where the fourth uplink shared channel is an uplink shared channel after the TCI state changes.

Alternatively, 610: The network device configures the second TCI state corresponding to a fourth uplink shared channel to be the same as the first TCI state corresponding to the third uplink shared channel.

The fifth downlink shared channel is a downlink shared channel after the TCI state changes. The second TCI state corresponding to the fifth downlink shared channel may be configured based on the first TCI state corresponding to the fourth downlink shared channel. Alternatively, the second TCI state corresponding to the fifth downlink shared channel may be configured based on the first TCI state corresponding to the third uplink shared channel. Similarly, the fourth uplink shared channel is an uplink shared channel after the TCI state changes. The second TCI state corresponding to the fourth uplink shared channel may be configured based on the first TCI state corresponding to the fourth downlink shared channel. Alternatively, the second TCI state corresponding to the fourth uplink shared channel may be configured based on the first TCI state corresponding to the third uplink shared channel. Therefore, in this embodiment of this application, the network device may both configure the second TCI state corresponding to the fifth downlink shared channel and configure the second TCI state corresponding to the fourth uplink shared channel by continuing to use the first TCI state configured by the network device before the TCI state changes. Therefore, it is ensured that data can be correctly sent and received on the fifth downlink shared channel and the fourth uplink shared channel.

In the foregoing embodiment, the BWP switching triggered by the RRC signaling and the BWP switching triggered by the DCI are described in detail. The following describes another scenario of triggering BWP switching.

Figure 7A:
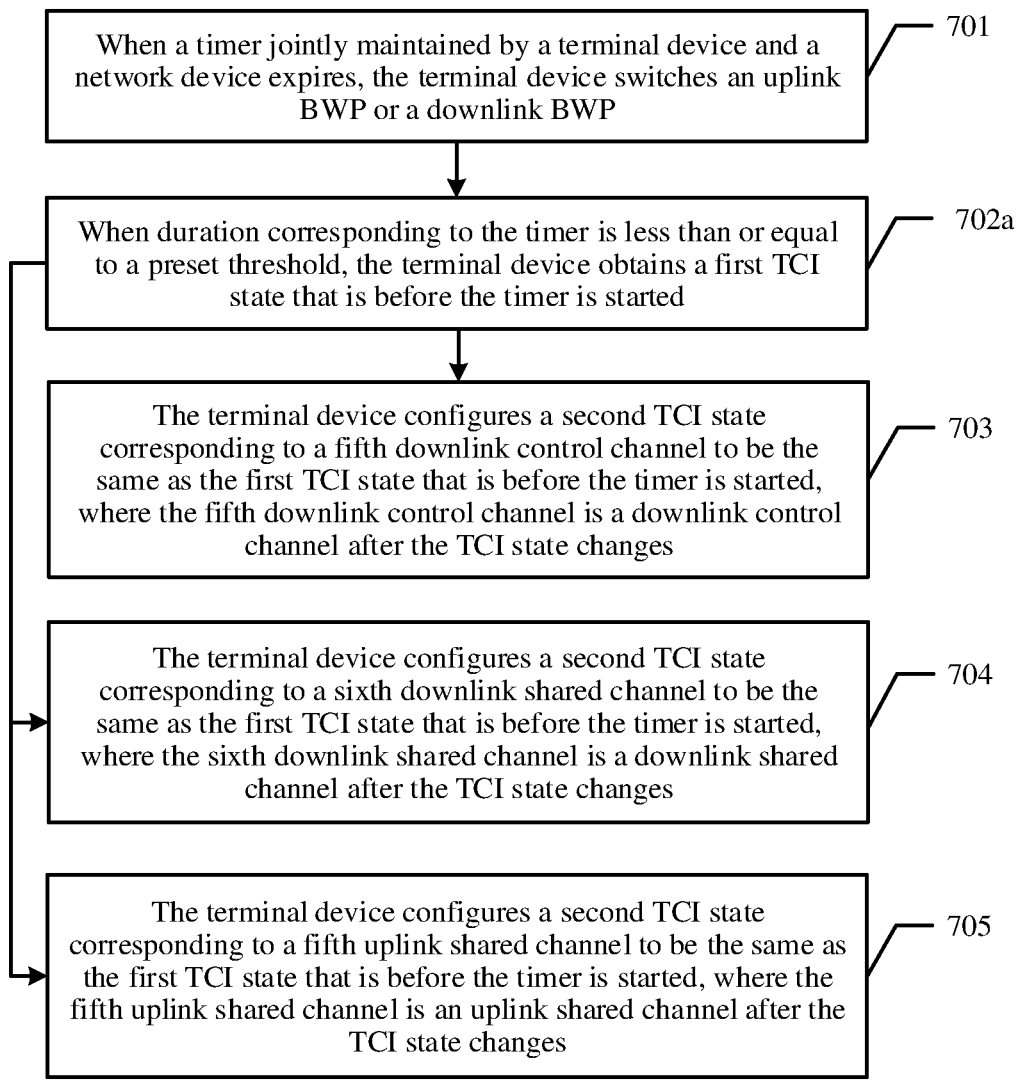
FIG. 7a is another schematic block flowchart of a state configuration method performed by a terminal device according to an embodiment of this application.
Figure 7B:
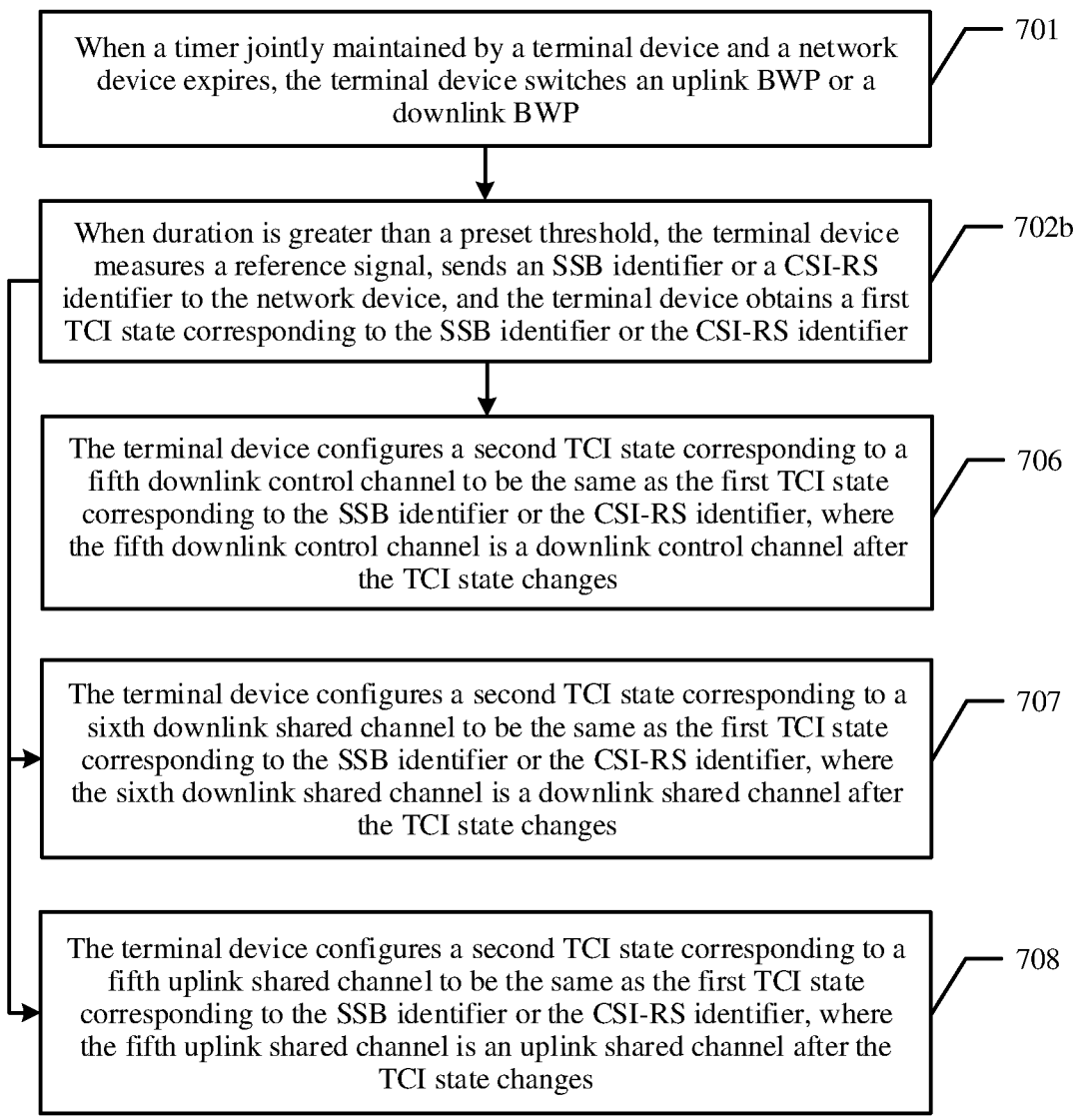
FIG. 7b is another schematic block flowchart of a state configuration method performed by a terminal device according to an embodiment of this application.

In some embodiments of this application, as shown in FIG. 7a and FIG. 7b, step S01 of determining, by the terminal device, that a TCI state configured by the network device changes includes:

701: When a timer jointly maintained by the terminal device and the network device expires, the terminal device switches an uplink BWP or a downlink BWP.

When the BWP is switched, the TCI state configured by the network device changes, and the TCI state configured by the network device is used to send and receive data between the terminal device and the network device.

In some embodiments of this application, as shown in FIG. 7a, step S02 of obtaining, by the terminal device, a first TCI state configured by the network device before the TCI state changes includes:

702a: When duration corresponding to the timer is less than or equal to a preset threshold, the terminal device obtains the first TCI state that is before the timer is started.

Alternatively, 702b: When the duration is greater than the preset threshold, the terminal device measures a reference signal, sends an SSB identifier or a CSI-RS identifier to the network device, and the terminal device obtains the first TCI state corresponding to the SSB identifier or the CSI-RS identifier.

The threshold is a value preconfigured by the network device, and a specific value is not limited herein. Based on the relationship between the duration corresponding to the timer and the threshold, different manners are used for obtaining the first TCI state.

In some embodiments of this application, as shown in FIG. 7a, step S03 of configuring, by the terminal device, a second TCI state to be the same as the first TCI state includes:

703: The terminal device configures the second TCI state corresponding to a fifth downlink control channel to be the same as the first TCI state that is before the timer is started, where the fifth downlink control channel is a downlink control channel after the TCI state changes.

Alternatively, 704: The terminal device configures the second TCI state corresponding to a sixth downlink shared channel to be the same as the first TCI state that is before the timer is started, where the sixth downlink shared channel is a downlink shared channel after the TCI state changes.

Alternatively, 705: The terminal device configures the second TCI state corresponding to a fifth uplink shared channel to be the same as the first TCI state that is before the timer is started, where the fifth uplink shared channel is an uplink shared channel after the TCI state changes.

In the foregoing embodiment of this application, the terminal device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In some embodiments of this application, as shown in FIG. 7b, step S03 of configuring, by the terminal device, a second TCI state to be the same as the first TCI state includes:

706: The terminal device configures the second TCI state corresponding to a fifth downlink control channel to be the same as the first TCI state corresponding to the SSB identifier or the CSI-RS identifier, where the fifth downlink control channel is a downlink control channel after the TCI state changes.

Alternatively, 707: The terminal device configures the second TCI state corresponding to a sixth downlink shared channel to be the same as the first TCI state corresponding to the SSB identifier or the CSI-RS identifier, where the sixth downlink shared channel is a downlink shared channel after the TCI state changes.

Alternatively, 708: The terminal device configures the second TCI state corresponding to a fifth uplink shared channel to be the same as the first TCI state corresponding to the SSB identifier or the CSI-RS identifier, where the fifth uplink shared channel is an uplink shared channel after the TCI state changes.

In the foregoing embodiment of this application, the terminal device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

Figure 8A:
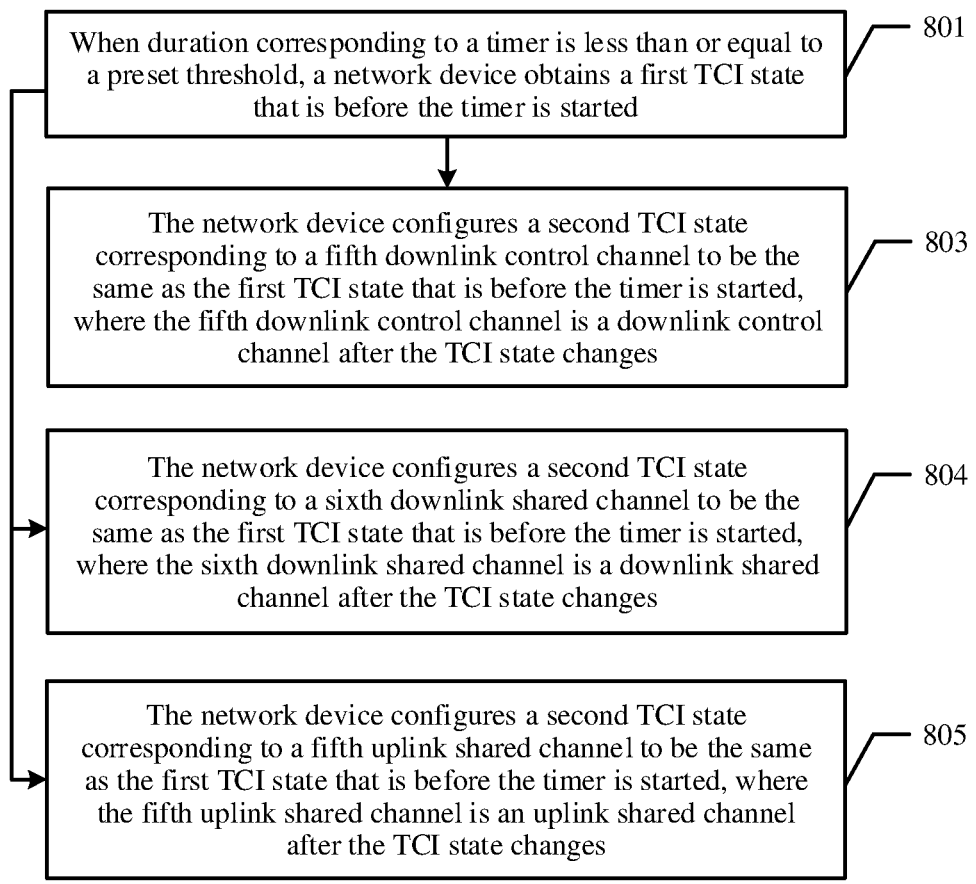
FIG. 8a is another schematic block flowchart of a state configuration method performed by a network device according to an embodiment of this application.
Figure 8B:
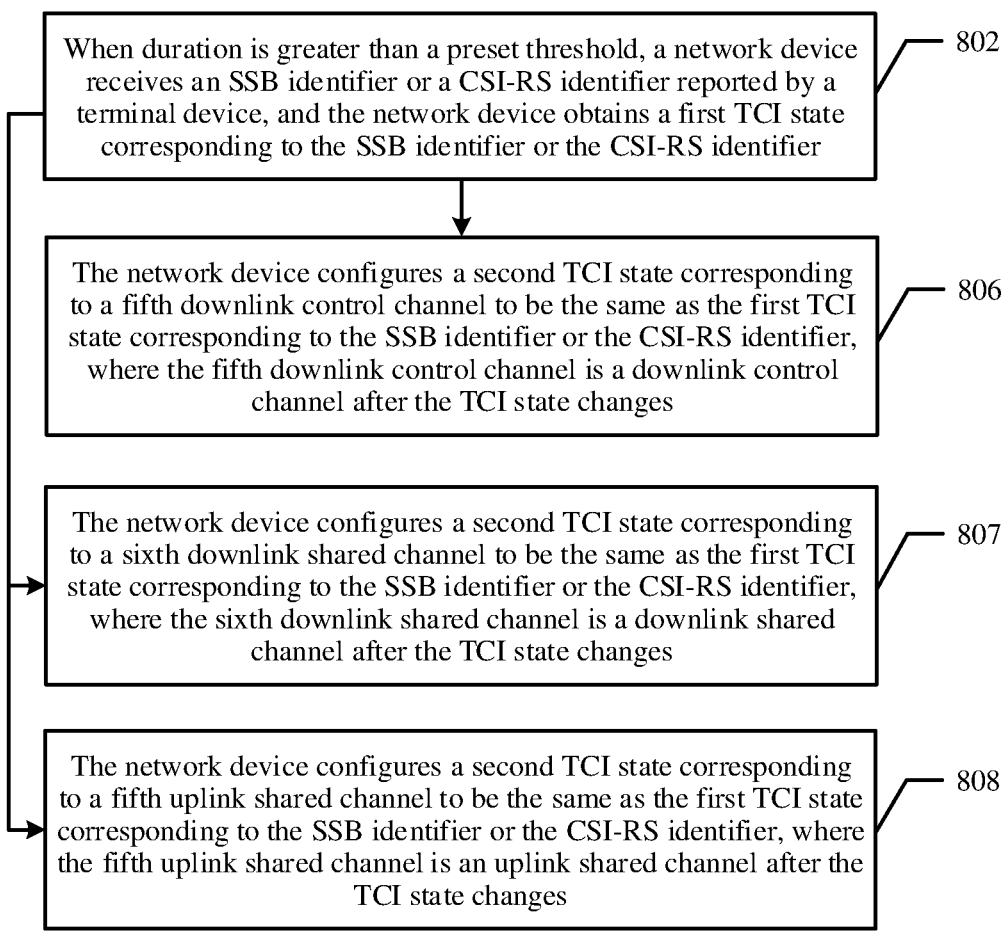
FIG. 8b is another schematic block flowchart of a state configuration method performed by a network device according to an embodiment of this application.

In some embodiments of this application, as shown in FIG. 8a and FIG. 8b, step S11 of obtaining, by the network device, a first TCI state configured by the network device before the TCI state changes includes:

801: When duration corresponding to a timer is less than or equal to a preset threshold, the network device obtains the first TCI state that is before the timer is started.

802: When the duration is greater than the preset threshold, the network device receives an SSB identifier or a CSI-RS identifier reported by the terminal device, and the network device obtains the first TCI state corresponding to the SSB identifier or the CSI-RS identifier.

The threshold is a value preconfigured by the network device, and a specific value is not limited herein. Based on the relationship between the duration corresponding to the timer and the threshold, different manners are used for obtaining the first TCI state.

In some embodiments of this application, as shown in FIG. 8a, step S12 of configuring, by the network device, a second TCI state to be the same as the first TCI state includes:

803: The network device configures the second TCI state corresponding to a fifth downlink control channel to be the same as the first TCI state that is before the timer is started, where the fifth downlink control channel is a downlink control channel after the TCI state changes.

Alternatively, 804: The network device configures the second TCI state corresponding to a sixth downlink shared channel to be the same as the first TCI state that is before the timer is started, where the sixth downlink shared channel is a downlink shared channel after the TCI state changes.

Alternatively, 805: The network device configures the second TCI state corresponding to a fifth uplink shared channel to be the same as the first TCI state that is before the timer is started, where the fifth uplink shared channel is an uplink shared channel after the TCI state changes.

In the foregoing embodiment of this application, the network device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

In some embodiments of this application, as shown in FIG. 8b, step S12 of configuring, by the network device, a second TCI state to be the same as the first TCI state includes:

806: The network device configures the second TCI state corresponding to a fifth downlink control channel to be the same as the first TCI state corresponding to the SSB identifier or the CSI-RS identifier, where the fifth downlink control channel is a downlink control channel after the TCI state changes.

Alternatively, 807: The network device configures the second TCI state corresponding to a sixth downlink shared channel to be the same as the first TCI state corresponding to the SSB identifier or the CSI-RS identifier, where the sixth downlink shared channel is a downlink shared channel after the TCI state changes.

Alternatively, 808: The network device configures the second TCI state corresponding to a fifth uplink shared channel to be the same as the first TCI state corresponding to the SSB identifier or the CSI-RS identifier, where the fifth uplink shared channel is an uplink shared channel after the TCI state changes.

In the foregoing embodiment of this application, the network device may both configure the second TCI state corresponding to the sixth downlink shared channel and configure the second TCI state corresponding to the fifth uplink shared channel by continuing to use the first TCI state configured by the network device before the TCI state changes. Therefore, it is ensured that data can be correctly sent and received on the sixth downlink shared channel and the fifth uplink shared channel.

Figure 9:
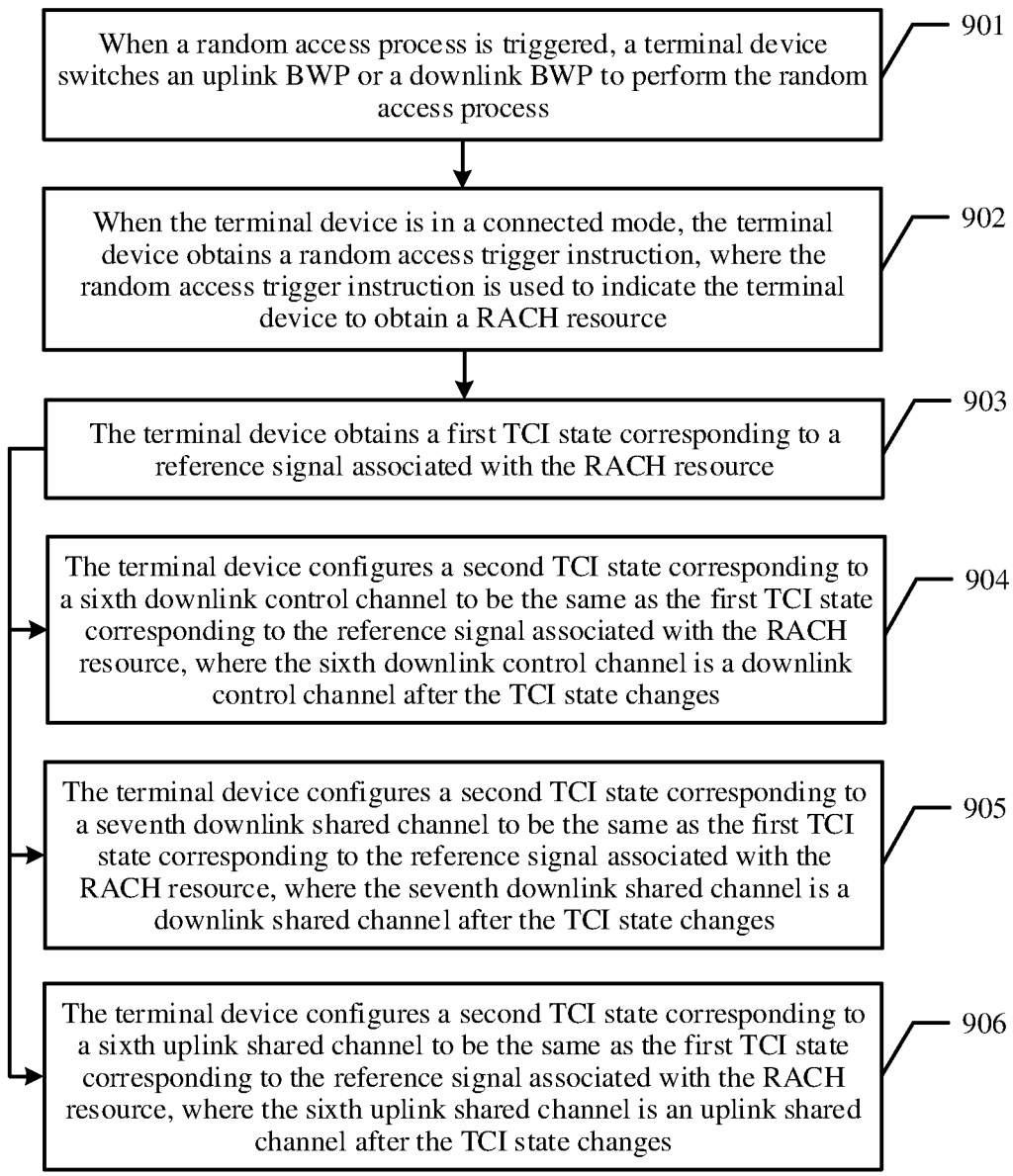
FIG. 9 is another schematic block flowchart of a state configuration method performed by a terminal device according to an embodiment of this application.

In some embodiments of this application, as shown in FIG. 9, step S01 of determining, by the terminal device, that a TCI state configured by the network device changes includes:

901: When a random access process is triggered, the terminal device switches an uplink BWP or a downlink BWP to perform the random access process.

When the BWP is switched, the TCI state configured by the network device changes, and the TCI state configured by the network device is used to send and receive data between the terminal device and the network device.

In some embodiments of this application, as shown in FIG. 9, step S11 of obtaining, by the terminal device, a first TCI state configured by the network device before the TCI state changes includes:

902: When the terminal device is in a connected mode, the terminal device obtains a random access trigger instruction, where the random access trigger instruction is used to indicate the terminal device to obtain a random access channel (RACH) resource.

903: The terminal device obtains the first TCI state corresponding to a reference signal associated with the RACH resource.

In some embodiments of this application, as shown in FIG. 9, step S03 of configuring, by the terminal device, a second TCI state to be the same as the first TCI state includes:

904: The terminal device configures the second TCI state corresponding to a sixth downlink control channel to be the same as the first TCI state corresponding to the reference signal associated with the RACH resource, where the sixth downlink control channel is a downlink control channel after the TCI state changes.

Alternatively, 905: The terminal device configures the second TCI state corresponding to a seventh downlink shared channel to be the same as the first TCI state corresponding to the reference signal associated with the RACH resource, where the seventh downlink shared channel is a downlink shared channel after the TCI state changes.

Alternatively, 906: The terminal device configures the second TCI state corresponding to a sixth uplink shared channel to be the same as the first TCI state corresponding to the reference signal associated with the RACH resource, where the sixth uplink shared channel is an uplink shared channel after the TCI state changes.

In the foregoing embodiment of this application, the terminal device may both configure the second TCI state corresponding to the seventh downlink shared channel and configure the second TCI state corresponding to the sixth uplink shared channel by continuing to use the first TCI state configured by the network device before the TCI state changes. Therefore, it is ensured that data can be correctly sent and received on the seventh downlink shared channel and the sixth uplink shared channel.

Figure 10:
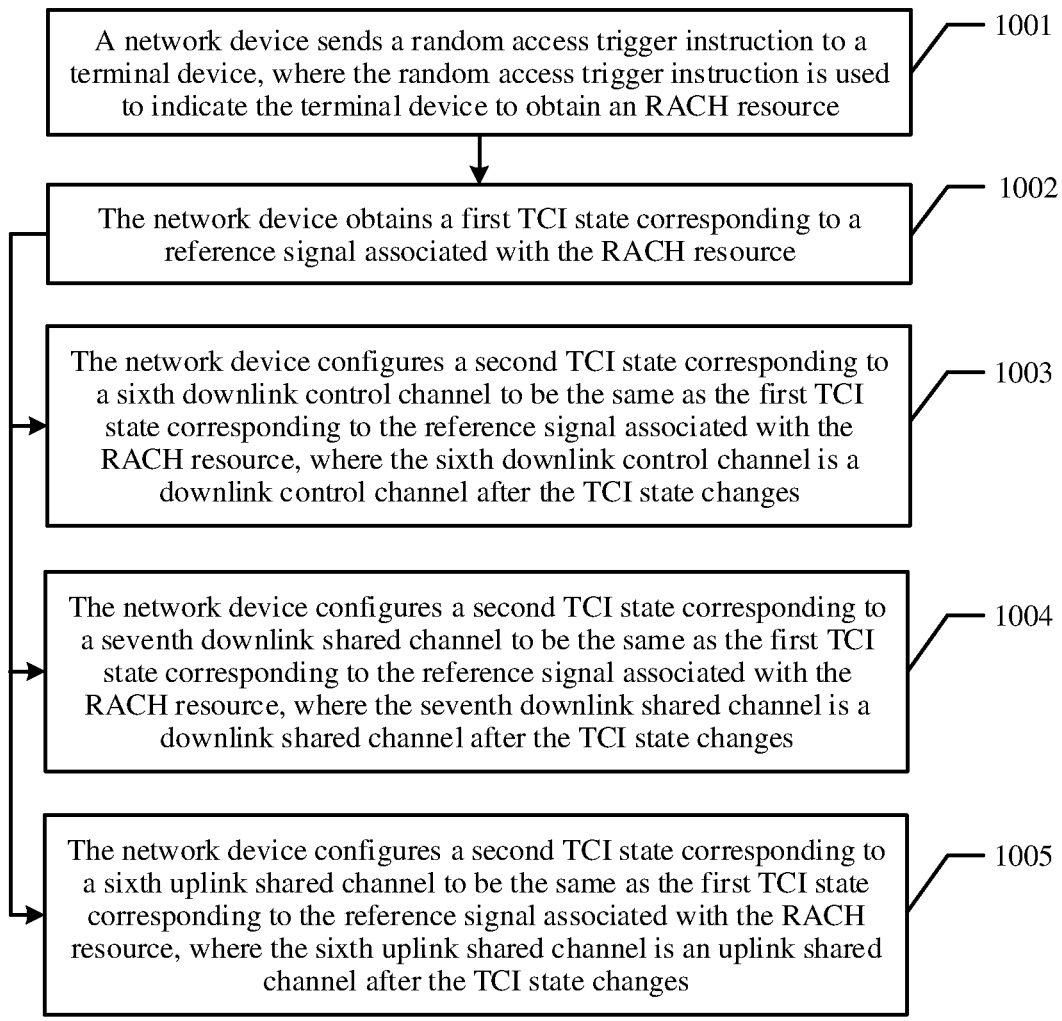
FIG. 10 is another schematic block flowchart of a state configuration method performed by a network device according to an embodiment of this application.

In some embodiments of this application, as shown in FIG. 10, step S11 of obtaining, by the network device, a first TCI state configured by the network device before the TCI state changes includes:

1001: The network device sends a random access trigger instruction to the terminal device, where the random access trigger instruction is used to indicate the terminal device to obtain an RACH resource.

1002: The network device obtains the first TCI state corresponding to a reference signal associated with the RACH resource.

In some embodiments of this application, as shown in FIG. 10, step S12 of configuring, by the network device, a second TCI state to be the same as the first TCI state includes:

1003: The network device configures the second TCI state corresponding to a sixth downlink control channel to be the same as the first TCI state corresponding to the reference signal associated with the RACH resource, where the sixth downlink control channel is a downlink control channel after the TCI state changes.

Alternatively, 1004: The network device configures the second TCI state corresponding to a seventh downlink shared channel to be the same as the first TCI state corresponding to the reference signal associated with the RACH resource, where the seventh downlink shared channel is a downlink shared channel after the TCI state changes.

Alternatively, 1005: The network device configures the second TCI state corresponding to a sixth uplink shared channel to be the same as the first TCI state corresponding to the reference signal associated with the RACH resource, where the sixth uplink shared channel is an uplink shared channel after the TCI state changes.

In the foregoing embodiment of this application, the network device may both configure the second TCI state corresponding to the seventh downlink shared channel and configure the second TCI state corresponding to the sixth uplink shared channel by continuing to use the first TCI state configured by the network device before the TCI state changes. Therefore, it is ensured that data can be correctly sent and received on the seventh downlink shared channel and the sixth uplink shared channel.

In some embodiments of this application, step S01 of determining, by the terminal device, that a TCI state configured by the network device changes includes:

in a secondary cell activation process, determining, by the terminal device, that no TCI state is configured for a first reference signal used for measuring a channel quality indicator (CQI) in a secondary cell.

In some embodiments of this application, step S02 of obtaining, by the terminal device, a first TCI state configured by the network device before the TCI state changes includes:

determining, by the terminal device, the first TCI state corresponding to a second reference signal reported by the terminal device to the network device.

In some embodiments of this application, step S03 of configuring, by the terminal device, a second TCI state to be the same as the first TCI state includes:

configuring, by the terminal device, the second TCI state corresponding to the first reference signal to be the same as the first TCI state corresponding to the second reference signal; or configuring, by the terminal device, the second TCI state corresponding to a seventh downlink control channel to be the same as the first TCI state corresponding to the second reference signal, where the seventh downlink control channel is a downlink control channel after the TCI state changes; or configuring, by the terminal device, the second TCI state corresponding to an eighth downlink shared channel to be the same as the first TCI state corresponding to the second reference signal, where the eighth downlink shared channel is a downlink shared channel after the TCI state changes.

In some embodiments of this application, step S11 of obtaining, by the network device, a first TCI state configured by the network device before the TCI state changes includes:

determining, by the network device, the first TCI state corresponding to a second reference signal reported by the terminal device to the network device.

In some embodiments of this application, step S12 of configuring, by the network device, a second TCI state to be the same as the first TCI state includes:

configuring, by the network device, the second TCI state corresponding to a first reference signal to be the same as the first TCI state corresponding to the second reference signal; or configuring, by the network device, the second TCI state corresponding to a seventh downlink control channel to be the same as the first TCI state corresponding to the second reference signal, where the seventh downlink control channel is a downlink control channel after the TCI state changes; or configuring, by the network device, the second TCI state corresponding to an eighth downlink shared channel to be the same as the first TCI state corresponding to the second reference signal, where the eighth downlink shared channel is a downlink shared channel after the TCI state changes.

For example, in a secondary cell activation process of the terminal device, if the network device configures no TCI state for a CSI-RS used for measuring a channel quality indicator (CQI) in a secondary cell, the terminal device reports, to the network device in the activation process, an SSB identifier or a CSI-RS identifier that is in the secondary cell and that represents the TCI state. After the reporting and before receiving the TCI state configured by the network device for the CSI-RS used for measuring the CQI, the terminal device considers that the CSI-RS used for measuring the CQI and a reported SSB or CSI-RS are quasi co-located, that is, the CSI-RS used for measuring the CQI and the reported SSB or CSI-RS correspond to the same TCI state. After the activation process is completed, before receiving a TCI state configured or activated by the network device for receiving the PDCCH and the PDSCH, the terminal device considers that the PDCCH and the PDSCH are quasi co-located with the reported SSB or CSI-RS, that is, CSI-RSs of the PDCCH and the PDSCH and the reported SSB or CSI-RS correspond to the same TCI state.

In the foregoing embodiment of this application, the terminal device determines, by using an L1-RSRP measurement process in the secondary cell activation process, the SSB identifier or the CSI-RS identifier representing the TCI state. Alternatively, the terminal device determines, by using a cell detection process or an automatic gain control (AGC) adjustment process before or during the secondary cell activation process, the SSB identifier or the CSI-RS identifier representing the TCI state.

To better understand and implement the foregoing solutions in the embodiments of this application, the following uses corresponding application scenarios as examples for specific description.

In this embodiment of this application, an example in which a TCI state configured by a network device changes when the network device indicates a terminal device to switch a BWP is used for description. The network device is specifically a base station, and the terminal device is specifically UE. In this embodiment of this application, after the BWP is switched and before the TCI state is activated, the UE and the network device need to determine, by using a predefined method, a transmit beam for scheduling a PDCCH and a PDSCH, that is, determine a target reference signal quasi co-located (QCL) with a corresponding DMRS port.

In this embodiment of this application, types of BWP switching may include the following four types: BWP switching caused by RRC signaling, BWP switching triggered by DCI, BWP switching to a default BWP when a timer expires, and the UE needs to switch to an initial uplink BWP when no RACH resource exists in an active uplink BWP during random access triggering.

In this embodiment of this application, after the BWP is switched and before a TCI state activation command is delivered, to ensure that the UE correctly sends and receives data, the UE assumes that an RS that needs to be pointed by using a TCI state of a DMRS port of a PDCCH or a PDSCH may include the following three implementations:

1. After the RRC signaling or the DCI triggers the UE to switch the BWP and before the network activates a new TCI state, the UE assumes that a DMRS port of a PDCCH, a PDSCH, or a PUSCH is quasi co-located with a PDCCH or a PDSCH for receiving the RRC signaling or the DCI in an original BWP.
2. After the BWP switching triggered by the timer, if duration of the timer is less than a threshold, the UE assumes that a DMRS port of a PDCCH, a PDSCH, or a PUSCH needs to be quasi co-located with a PDCCH, a PDSCH, or PUSCH before the BWP switching. If duration of the timer exceeds the threshold, the UE needs to perform L1-RSRP measurement and reporting. In this case, after the UE and the network device determine to switch the BWP based on a reported reference signal ID and before the network device activates a new TCI state, the DMRS port of the PDCCH, the PDSCH, or the PUSCH of the UE is quasi co-located with a reference signal corresponding to the reported reference signal ID.
3. After the BWP switching triggered by a MAC layer or the BWP switching triggered by initiation of random access, the UE assumes that a DMRS port of a PDCCH, a PDSCH, or a PUSCH needs to be quasi co-located with an SSB or a CSI-RS associated with a RACH resource of the UE. The random access is associated with a reference signal, and an RACH triggered by a beam failure (BF) is associated with a CSI-RS.

In this embodiment of this application, both the UE and the base station need to ensure correspondences between TCI states of control channel resource sets (CORESET) before and after the BWP switching.

Quantities of CORESETs in all BWPs configured by the network device need to be the same, and TCI states of CORESETs having a same ID are in a correspondence. In this case, after the BWP is switched and before a new TCI state is activated, the UE may assume that TCI states of corresponding CORESETs before and after the switching are the same.

After the BWP switching and before a new TCI state is activated, the UE assumes that TCI states corresponding to all CORESETs in a new BWP are the same and point to a same set of TCI RSs. The TCI state is the same as a TCI state of one CORESET in an original BWP, and the CORESET may be one of a predefined CORESET or a CORESET used by the UE to receive RRC signaling and DCI. The predefined CORESET is a CORESET corresponding to an L1 ACK; or a CORESET having another predefined CORESET ID, for example, a CORESET #0.

In this embodiment of this application, both the UE and the base station need to ensure a correspondence between TCI states of PDSCHs before and after the BWP switching, and the UE needs to continue to use the TCI state corresponding to the PDSCH for receiving RRC signaling in the old BWP. For the switching triggered by the DCI, the UE continues to use a TCI state corresponding to a PDCCH for receiving the DCI in the old BWP; or the UE continues to use the TCI state corresponding to the PDSCH before the DCI is received.

The following specifically describes a first embodiment of the solutions of this application. For BWP switching triggered by RRC signaling, after the switching, the UE assumes that a transmit beam used by the network device to schedule a PDSCH and a PDCCH in a new BWP is the same as that used for sending the RRC signaling used to indicate the BWP switching in an old BWP. That is, a TCI state of the PDCCH or the PDSCH in the new BWP points to a target reference signal corresponding to a TCI state of the RRC signaling. The following uses an example in which the UE configures the TCI state for description. A method for configuring the TCI state by the network device is similar to a method for configuring the TCI state by the UE. This embodiment mainly includes the following steps.

Step S21: The network device configures a new first active downlink bandwidth part identifier (firstActiveDownlinkBWP-Id) for the UE, to indicate the UE to switch from the BWP to the BWP, where the RRC signaling is scheduled by using a corresponding CORESET, that is, scheduled by using the PDCCH and carried on the corresponding PDSCH.

Step S22: The UE receives the PDCCH based on a candidate reference signal pointed by using a TCI state in a configuration of the CORESET and a candidate reference signal pointed by using a TCI state activated by using a MAC CE, and receives PDSCH data based on a candidate reference signal pointed by using a TCI state in a configuration of the PDSCH, the candidate reference signal pointed by using the TCI state activated by using the MAC CE, and a reference signal indicated by DCI.

For a TCI state corresponding to the PDCCH, the network device first configures a maximum of 64 candidate target reference signals by using a higher layer parameter, and then activates one of the target reference signals by using the MAC CE. For a TCI state corresponding to the PDSCH, the network device first configures 64 candidate target reference signals by using a higher layer parameter, then semi-dynamically activates eight of the target reference signals by using the MAC CE, and finally determines, by using DCI before each transmission, a reference signal to be used by the UE.

Step S23: The UE switches the BWP based on the RRC signaling.

After the BWP is switched, the TCI states of the PDCCH and the PDSCH in the new BWP is not activated by using a corresponding MAC CE.

Step S24a: The UE assumes that TCI states of all CORESETs in the new BWP are the same as a TCI state of (one of) CORESETs of the RRC signaling used by the UE to schedule the BWP switching in the old BWP. If an RRC message carrying the command is simultaneously scheduled by using a plurality of CORESETs, the UE assumes that a CORESET corresponding to an L1 ACK is fed back.

Step S24b: The UE assumes that TCI states of all CORESETs in the new BWP are the same as a TCI state of one of the CORESETs of the UE in the old BWP, where the CORESET may be a CORESET #0 or a common search space, for example, a CORESET having a smallest ID.

Step S24c: The UE assumes that a TCI state of each CORESET in the new BWP is the same as TCI states of corresponding CORESETs having a same CORESET ID number in the old BWP.

Step S25: After determining the TCI state of the PDCCH, the UE needs to assume a TCI state of the corresponding PDSCH to receive data, including corresponding data carrying the MAC CE.

Step S26: The UE assumes that the TCI state of the PDSCH in the new BWP is the same as the TCI state of the PDSCH that is of the UE and that carries the RRC signaling indicating the BWP switching in the old BWP.

Step S27: After using the assumption of the TCI states of the PDCCH and the PDSCH, the UE successfully receives a TCI state activation MAC CE in the new BWP, the UE uses the newly activated TCI state to send and receive data.

It should be noted that step S24a, step S24b, and step S24c are in an OR relationship, and may include different signaling sending manners.

It can be learned from the foregoing example that, after the BWP switching triggered by the RRC signaling and before the TCI state is activated, the UE may correctly assume a QCL relationship, and correctly receive the PDCCH and the PDSCH. Compared with the current technology in which the TCI state is configured to point to an SSB, the target reference signal pointed by using the TCI state for scheduling data in the old BWP is more accurate and time-sensitive, and have better performance. Using of the SSB may cause the UE to measure the SSB again for beam management, or performance of the SSB may be poor due to long passage of recorded time when the SSB is used.

The following specifically describes a second embodiment of the solutions of this application. For BWP switching triggered by DCI, the following uses an example in which the UE configures a TCI state. A method for configuring the TCI state by the network device is similar to a method for configuring the TCI state by the UE. This embodiment mainly includes the following steps.

Step S31: The network device sends a DCI format 0_1 or 1_1 to the UE, to indicate the UE to switch to another BWP to work.

Step S32: The UE receives the DCI based on a candidate reference signal pointed by using a TCI state in a configuration of a CORESET and a reference signal pointed by using a TCI state activated by using a MAC CE.

Step S33: The UE switches a BWP based on the DCI.

After the BWP is switched, TCI states of a PDCCH and a PDSCH in the new BWP is not activated by using a corresponding MAC CE.

Step S34a: The UE assumes that TCI states of all CORESETs in the new BWP are the same as a TCI state of a CORESET of the DCI used by the UE to schedule the BWP switching in an old BWP.

Step S34b: The UE assumes that TCI states of all CORESETs in the new BWP are the same as a TCI state of one of CORESETs of the UE in the old BWP, where the CORESET may be a CORESET #0 or a common search space, for example, a CORESET having a smallest ID.

Step S34c: The UE assumes that a TCI state of each CORESET in the new BWP is the same as TCI states of corresponding CORESETs having a same CORESET ID number in the old BWP.

Step S35: After determining a TCI state of the PDCCH, the UE needs to assume a TCI state of the corresponding PDSCH to receive data, including corresponding data carrying the MAC CE.

Step S36a: The UE assumes that the TCI state of the PDSCH in the new BWP is the same as the TCI state of the DCI that is sent and received by the UE in the old BWP and that carries a BWP switching command.

Step S36b: The UE assumes that the TCI state of the PDSCH in the new BWP is the same as the TCI state of the PDSCH received by the UE or the PUSCH sent by the UE in the old BWP, where the PDSCH is scheduled in a subframe, a slot, or a symbol before the DCI that carries the BWP switching command is received.

Step S37: After using the assumption of the TCI states of the PDCCH and the PDSCH, the UE successfully receives a TCI state activation MAC CE in the new BWP, the UE uses the newly activated TCI state to send and receive data.

It should be noted that step S34a, step S34b, and step S34c are in an OR relationship, and may include different signaling sending manners. It should be noted that step S36a and step S36b are in an OR relationship, and may include different signaling sending manners.

Embodiment 2 is similar to Embodiment 1, and a difference lies in that the RRC signaling is scheduled by using the PDCCH and data of the RRC signaling is carried on the PDSCH, but DCI is carried on only the PDCCH.

It can be learned from the foregoing example that, after the BWP switching triggered by the DCI and before the TCI state is activated, the UE may correctly assume a QCL relationship, and correctly receive the PDCCH and the PDSCH.

The following specifically describes a third embodiment of the solutions of this application. For BWP switching triggered by timer expiration, if duration of the timer is less than a specific threshold, the UE assumes that a TCI state is the same as that of an original BWP. If duration of the timer is greater than or equal to the threshold, the UE performs L1 RSRP measurement and reporting and determines a new TCI state. The following uses an example in which the UE configures the TCI state. A method for configuring the TCI state by the network device is similar to a method for configuring the TCI state by the UE. This embodiment mainly includes the following steps.

Step S41: An inactivity timer that is jointly maintained by the network device and the UE and that is used for BWP switching expires. In this case, the UE needs to switch an uplink BWP/a downlink BWP to a default BWP. A value of the timer indicates duration during which the UE has not been continuously scheduled by a network.

Step S42a: When the value of the timer is less than or equal to a threshold, if the UE needs to send and receive data after switching to the default BWP, before the TCI state is activated, the UE may assume that the TCI state is the same as a TCI state used for sending and receiving data on the last subframe/slot/symbol before the timer in the old BWP is started.

Step S42b: When the value of the timer is greater than the threshold, if the UE needs to send and receive data after switching to the default BWP, the UE needs to perform RSRP measurement and reporting once.

Step S43: After using assumption of TCI states of a PDCCH and a PDSCH, the UE successfully receives a TCI state activation MAC CE in the new BWP and after the TCI state is activated, the UE uses the newly activated TCI state to send and receive data.

It should be noted that step S42a and step S42b are in an OR relationship, and may include different signaling sending manners. The relationship between the timer and the threshold means that after the UE is not scheduled for a long period of time, the UE should not be required to retain beam information used, before the time, when the UE is scheduled for sending and receiving. There are a plurality of specific values or calculation methods of the threshold, which is not limited herein.

It can be learned from the foregoing example that, in this embodiment of this application, after the BWP switching triggered by the timer expiration and before the TCI state is activated, the UE may correctly assume a QCL relationship, and correctly receive the PDCCH and the PDSCH.

The following specifically describes a fourth embodiment of the solutions of this application. For BWP switching triggered by a RACH, a TCI state assumed by the UE needs to point to an SSB or a CSI-RS associated with a PRACH resource. The following uses an example in which the UE configures the TCI state. A method for configuring a TCI state by the network device is similar to a method for configuring the TCI state by the UE. This embodiment mainly includes the following steps.

Step S51: After an RACH in a connected mode is triggered, the UE needs to perform BWP switching to perform random access. Before a TCI state is activated, the UE needs to assume that the TCI state points to a reference signal associated with a PRACH resource, where the reference signal may be an SSB or a CSI-RS.

Step S52a: When the reference signal associated with a configuration of the PRACH resource is an SSB, before the TCI state is activated, the UE may assume that a TCI state of a DMRS port of a PDCCH or a PDSCH points to the SSB.

Step S52b: When the reference signal associated with a configuration of the PRACH resource is a CSI-RS, before the TCI state is activated, the UE may assume that a TCI state of a DMRS port of a PDCCH or a PDSCH points to the CSI-RS.

Step S53: After using the assumption of the TCI state of the PDCCH or the PDSCH, the UE performs the access by sending a message 1 (msg1). After the UE successfully performs the access and receives a TCI state activation MAC CE in a new BWP, the UE uses the newly activated TCI state to send and receive data.

It should be noted that step S52a and step S52b are in an OR relationship, and may include different signaling sending manners. In an NR system-based PRACH configuration, a PRACH resource for non-contention-based random access can be associated with an SSB or a CSI-RS, but a contention-based RACH can only be associated with an SSB.

It can be learned from the foregoing example that, in this embodiment of this application, after the BWP switching triggered by the RACH and before the TCI state is activated, the UE may correctly assume a QCL relationship, and correctly perform the random access.

It should be noted that, for brief description, the foregoing method embodiments are represented as a series of actions. However, a person skilled in the art should appreciate that this application is not limited to the described order of the actions, because according to this application, some steps may be performed in another order or simultaneously. A person skilled in the art should further appreciate that the embodiments described in this specification all belong to embodiments, and the involved actions and modules are not necessarily required for this application.

To better implement the foregoing solutions in the embodiments of this application, the following further provides related apparatuses for implementing the foregoing solutions.

Figure 11:
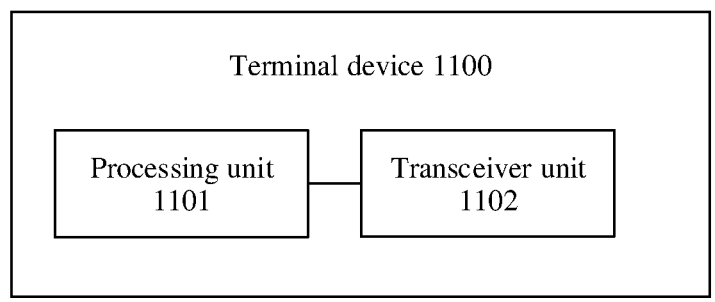
FIG. 11 is a schematic structural composition diagram of a terminal device according to an embodiment of this application.

An embodiment of this application further provides a terminal device 1100, to perform the state configuration method performed by the terminal device in FIG. 2, FIG. 3a, FIG. 3b, FIG. 5a, FIG. 5b, FIG. 7a, FIG. 7b, and FIG. 9. As shown in FIG. 11, the terminal device 1100 provided in this embodiment of this application includes:

a processing unit 1101, configured to determine that a TCI state configured by a network device changes, where the processing unit 1101 is further configured to obtain a first TCI state configured by the network device before the TCI state changes; and the processing unit 1101 is further configured to configure a second TCI state to be the same as the first TCI state; and when the second TCI state is the same as the first TCI state, a reference signal pointed by using the second TCI state and a reference signal pointed by using the first TCI state are quasi co-located; and a transceiver unit 1102, configured to: after the TCI state changes and before a third TCI state configured by the network device is activated, send and receive data by using the second TCI state.

In some embodiments of this application, the transceiver unit 1102 is further configured to receive radio resource configuration RRC signaling sent by the network device, where the RRC signaling is used to indicate the terminal device to switch an uplink bandwidth part BWP or a downlink BWP, and the BWP switching causes the change in the TCI state configured by the network device; and the processing unit 1101 is specifically configured to determine, based on the received RRC signaling, that the TCI state changes.

In some embodiments of this application, the processing unit 1101 is specifically configured to obtain the first TCI state corresponding to a first downlink control channel for scheduling the RRC signaling, and the first downlink control channel is a downlink control channel before the TCI state changes.

In some embodiments of this application, the processing unit 1101 is specifically configured to configure the second TCI state corresponding to a second downlink control channel to be the same as the first TCI state corresponding to the first downlink control channel, and the second downlink control channel is a downlink control channel after the TCI state changes.

In some embodiments of this application, when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

In some embodiments of this application, the processing unit 1101 is specifically configured to obtain the first TCI state corresponding to a first downlink shared channel that carries the RRC signaling, and the first downlink shared channel is a downlink shared channel before the TCI state changes.

Figure 12:
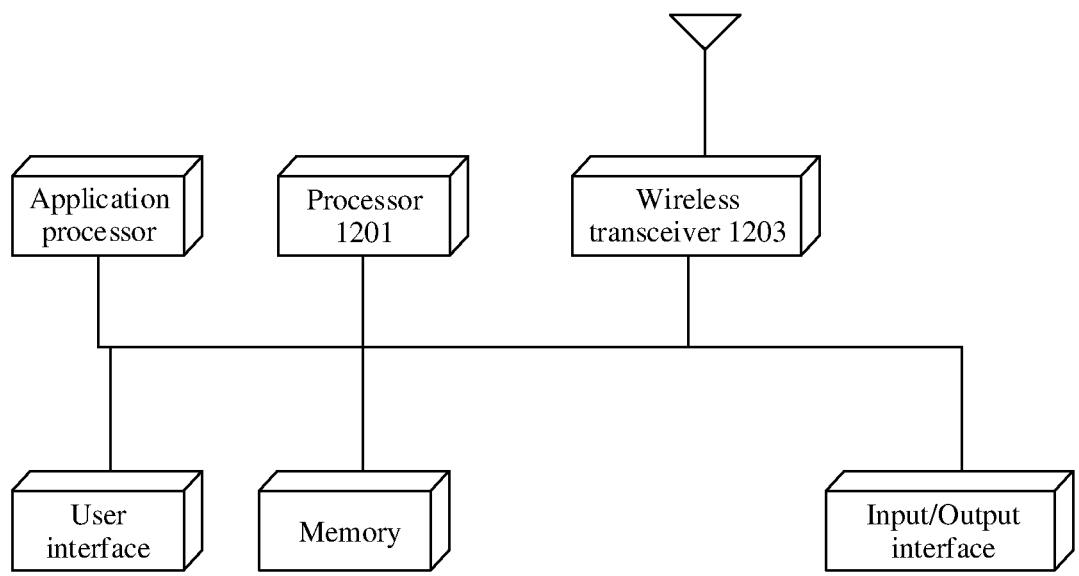
FIG. 12 is another schematic structural composition diagram of a terminal device according to an embodiment of this application.

In some embodiments of this application, the processing unit 1101 is specifically configured to configure the second TCI state corresponding to a second downlink shared channel to be the same as the first TCI state corresponding to the first downlink shared channel, and the second downlink shared channel is a downlink shared channel after the TCI state changes; or the processing unit 1101 is specifically configured to configure the second TCI state corresponding to a first uplink shared channel to be the same as the first TCI state corresponding to the first downlink shared channel, and the first uplink shared channel is an uplink shared channel after the TCI state changes For the terminal device in this embodiment, refer to a device shown in FIG. 12. The device includes a processor 1201, an application processor, a memory, a user interface, and some other elements (including a device such as a power supply that is not shown). In FIG. 12, the foregoing processing unit may be the processor 1201, and implements a corresponding function. The sending unit and/or the receiving unit may be a wireless transceiver 1203 in the figure, and the sending unit and/or the receiving unit implement/implements a corresponding function through an antenna. It may be understood that the elements shown in the figure are merely examples, and are not mandatory elements for implementing this embodiment.

Figure 13:
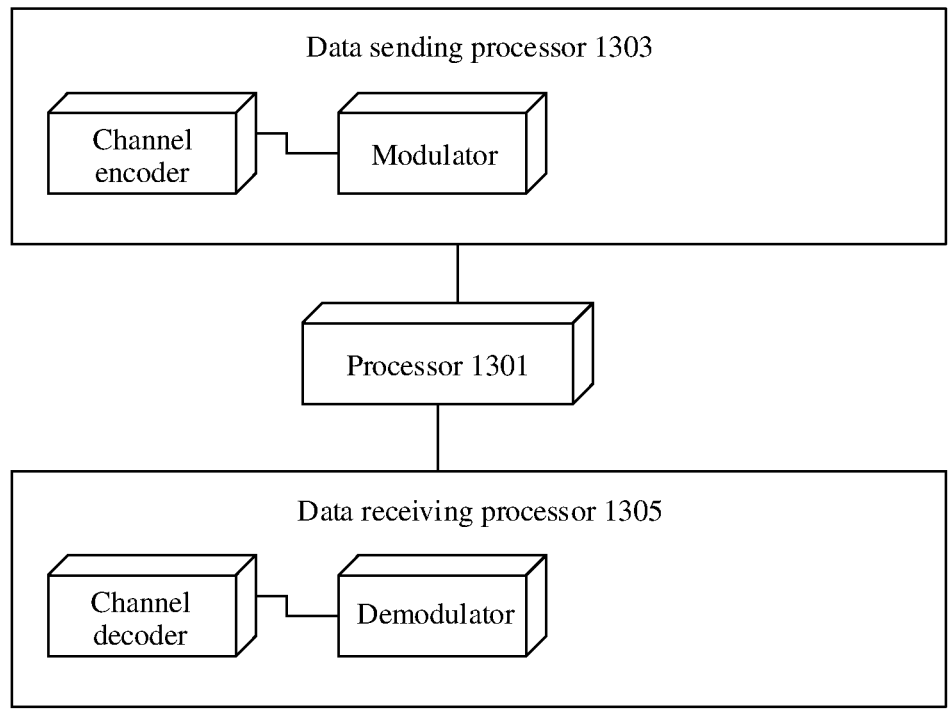
FIG. 13 is another schematic structural composition diagram of a terminal device according to an embodiment of this application.

For the terminal device in this embodiment, refer to a device shown in FIG. 13. In an example, the device can implement a function similar to a function of the processor in FIG. 12. In FIG. 13, the device includes a processor 1301, a data sending processor 1303, and a data receiving processor 1305. In FIG. 13, the foregoing processing unit may be the processor 1301, and implements a corresponding function. The sending unit may be the data sending processor 1303 in FIG. 13, and the receiving unit may be the data receiving processor 1305 in FIG. 13. Although a channel coder and a channel decoder are shown in the figure, it may be understood that the modules are merely examples, and do not constitute a limitation on this embodiment.

Figure 14:
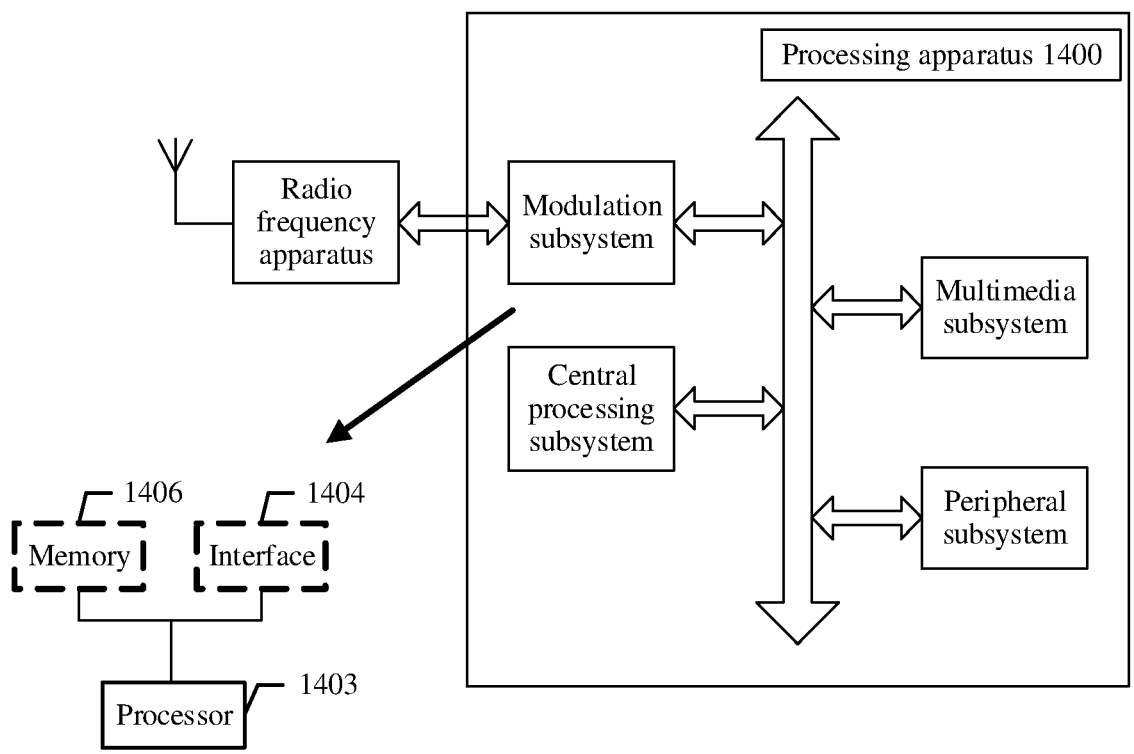
FIG. 14 is another schematic structural composition diagram of a terminal device according to an embodiment of this application.

FIG. 14 shows another form of this embodiment. A processing apparatus 1400 includes modules such as a modulation subsystem, a central processing subsystem, and a peripheral subsystem. The terminal device in this embodiment may be used as the modulation subsystem in the processing apparatus 1400. Specifically, the modulation subsystem may include a processor 1403 and an interface 1404. The processor 1403 implements a function of the foregoing processing unit, and the interface 1404 implements a function of the foregoing sending unit and/or receiving unit. In another variation, the modulation subsystem includes a memory 1406, a processor 1403, and a program that is stored in the memory and that can run on the processor. When the processor executes the program, the method embodiment performed by the terminal device is implemented. It should be noted that the memory 1406 may be non-volatile or volatile. The memory 1406 may be located in the modulation subsystem, or may be located in the processing apparatus 1400, provided that the memory 1406 can be connected to the processor 1403.

In another form of this embodiment, a computer-readable storage medium is provided. The computer-readable storage medium stores instructions. When the instructions are executed, the method performed by the terminal device is performed.

It should be noted that content, such as information exchange between the modules/units of the apparatus and the execution processes thereof, is based on the same idea as the method embodiment of this application, and produces the same technical effects as the method embodiment of this application. For specific content, refer to the foregoing description in the method embodiment of this application.

An embodiment of this application further provides a network device 1500, to perform the state configuration method performed by the network device in FIG. 2, FIG. 4a, FIG. 4b, FIG. 6a, FIG. 6b, FIG. 8a, FIG. 8b, and FIG. 10.

Figure 15:
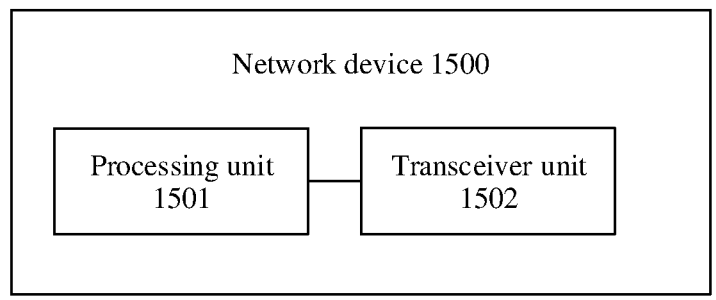
FIG. 15 is a schematic structural composition diagram of a network device according to an embodiment of this application.

As shown in FIG. 15, the network device 1500 provided in this embodiment of this application includes:
a processing unit 1501, configured to: when a TCI state configured by the network device changes, obtain a first TCI state configured by the network device before the TCI state changes, where
the processing unit 1501 is further configured to configure a second TCI state to be the same as the first TCI state; and when the second TCI state is the same as the first TCI state, a reference signal pointed by using the second TCI state and a reference signal pointed by using the first TCI state are quasi co-located; and
a transceiver unit 1502, configured to: after the TCI state changes and before a third TCI state configured by the network device is activated, send and receive data by using the second TCI state.

In some embodiments of this application, the transceiver unit 1502 is further configured to send radio resource configuration RRC signaling to a terminal device, where the RRC signaling is used to indicate the terminal device to switch an uplink bandwidth part BWP or a downlink BWP, and the BWP switching causes the change in the TCI state configured by the network device; and
the processing unit 1501 is specifically configured to determine, based on the sent RRC signaling, that the TCI state changes.

In some embodiments of this application, the processing unit 1501 is specifically configured to obtain the first TCI state corresponding to a first downlink control channel for scheduling the RRC signaling, and the first downlink control channel is a downlink control channel before the TCI state changes.

In some embodiments of this application, the processing unit 1501 is specifically configured to configure the second TCI state corresponding to a second downlink control channel to be the same as the first TCI state corresponding to the first downlink control channel, and the second downlink control channel is a downlink control channel after the TCI state changes.

In some embodiments of this application, when there are a plurality of second downlink control channels after the TCI state changes, second TCI states corresponding to all the second downlink control channels are the same; or
a quantity of second downlink control channels and a quantity of first downlink control channels are the same, and a second downlink control channel and a first downlink control channel whose channel identifiers are the same correspond to a same TCI state; or
when there are a plurality of first downlink control channels before the TCI state changes, the first downlink control channel corresponding to the first TCI state that is the same as the second TCI state is a predefined downlink control channel.

In some embodiments of this application, the processing unit 1501 is specifically configured to obtain the first TCI state corresponding to a first downlink shared channel that carries the RRC signaling, and the first downlink shared channel is a downlink shared channel before the TCI state changes.

In some embodiments of this application, the processing unit 1501 is specifically configured to configure the second TCI state corresponding to a second downlink shared channel to be the same as the first TCI state corresponding to the first downlink shared channel, and the second downlink shared channel is a downlink shared channel after the TCI state changes; or the processing unit 1501 is specifically configured to configure the second TCI state corresponding to a first uplink shared channel to be the same as the first TCI state corresponding to the first downlink shared channel, and the first uplink shared channel is an uplink shared channel after the TCI state changes It should be noted that content, such as information exchange between the modules/units of the apparatus and the execution processes thereof, is based on the same idea as the method embodiment of this application, and produces the same technical effects as the method embodiment of this application. For specific content, refer to the foregoing description in the method embodiments of this application.

Figure 16:
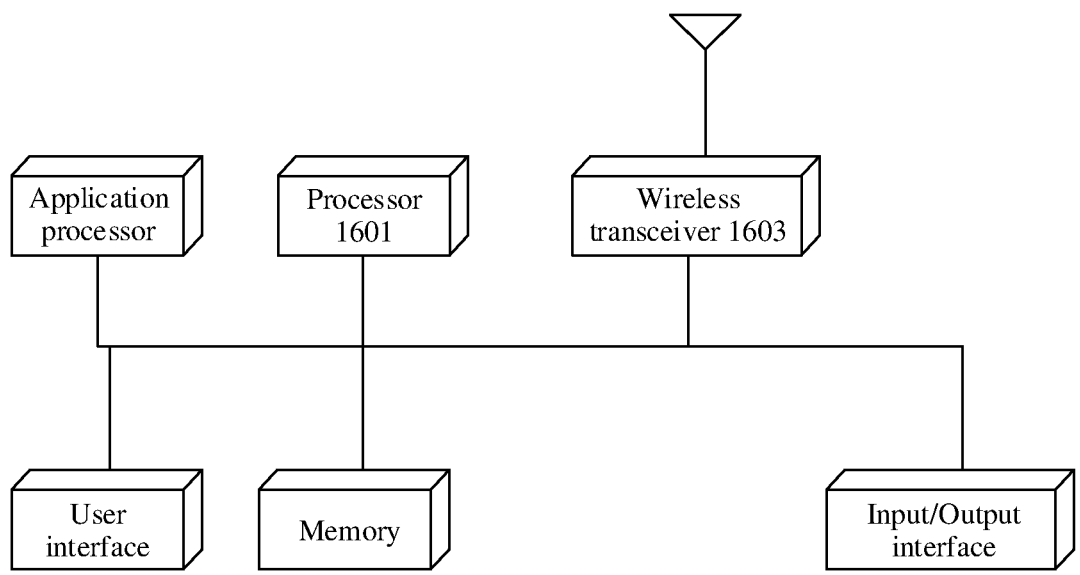
FIG. 16 is another schematic structural composition diagram of a network device according to an embodiment of this application.

For the network device in this embodiment, refer to a device shown in FIG. 16. The device includes a processor 1601, an application processor, a memory, a user interface, and some other elements (including a device such as a power supply that is not shown). In FIG. 16, the foregoing processing unit may be the processor 1601, and implements a corresponding function. The sending unit and/or the receiving unit may be a wireless transceiver 1603 in the figure, and the sending unit and/or the receiving unit implement/implements a corresponding function through an antenna. It may be understood that the elements shown in the figure are merely examples, and are not mandatory elements for implementing this embodiment.

Figure 17:
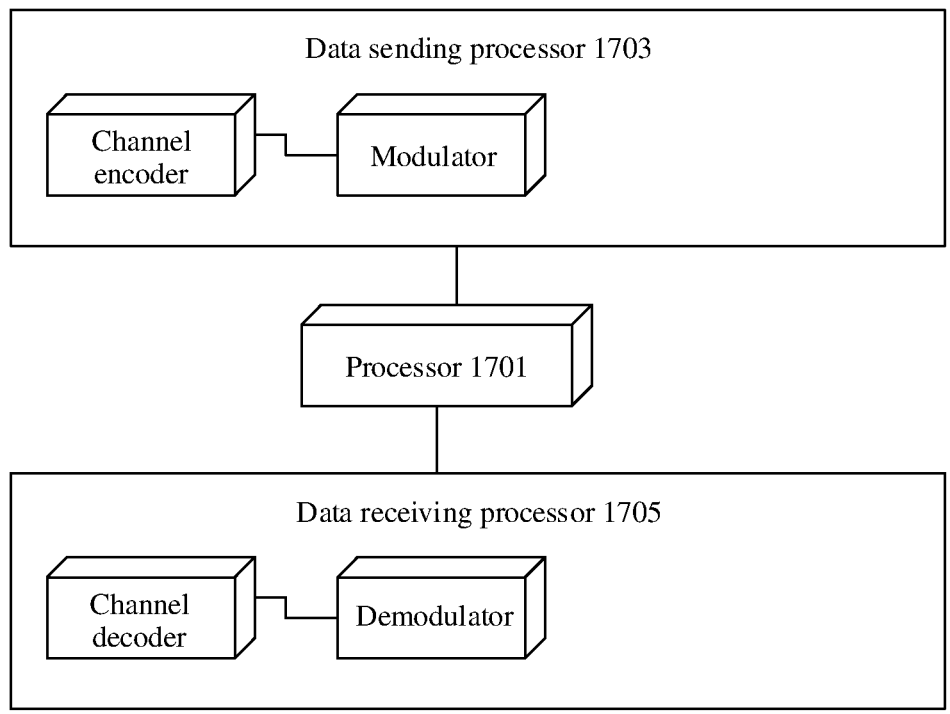
FIG. 17 is another schematic structural composition diagram of a network device according to an embodiment of this application.

For the network device in this embodiment, refer to a device shown in FIG. 17. In an example, the device can implement a function similar to a function of the processor in FIG. 16. In FIG. 17, the device includes a processor 1701, a data sending processor 1703, and a data receiving processor 1705. In FIG. 17, the foregoing processing unit may be the processor 1701, and implements a corresponding function. The sending unit may be the data sending processor 1703 in FIG. 17, and the receiving unit may be the data receiving processor 1705 in FIG. 17. Although a channel coder and a channel decoder are shown in the figure, it may be understood that the modules are merely examples, and do not constitute a limitation on this embodiment.

Figure 18:
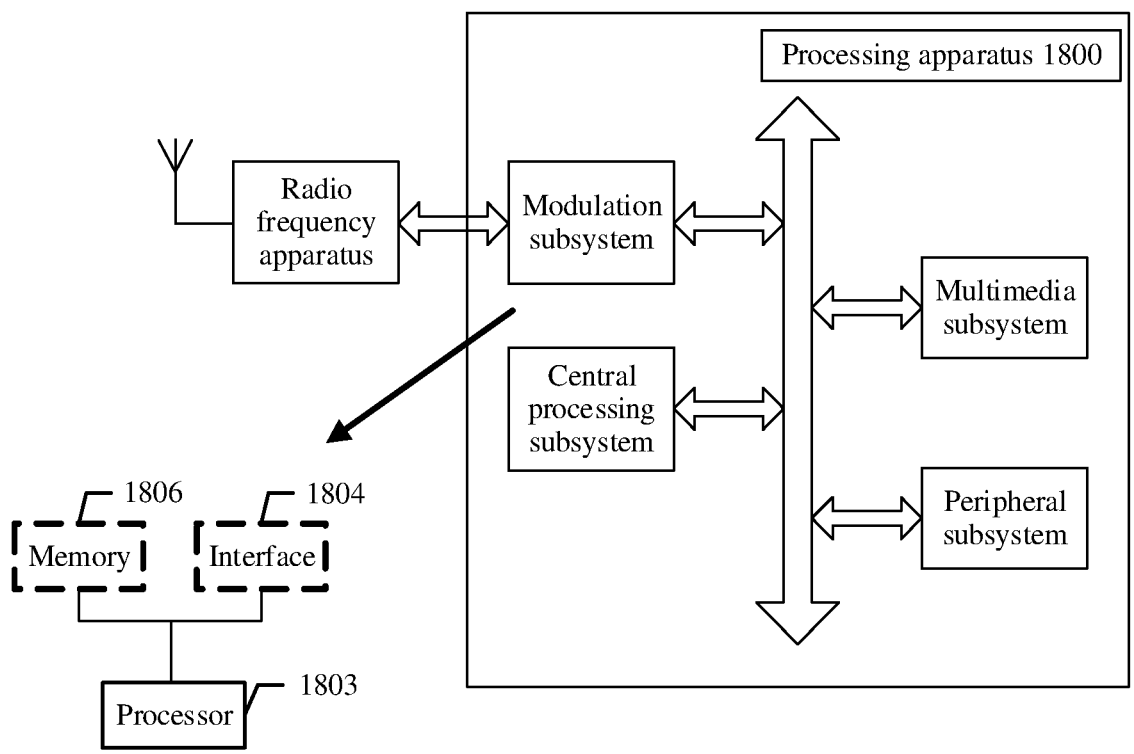
FIG. 18 is another schematic structural composition diagram of a network device according to an embodiment of this application.

FIG. 18 shows another form of this embodiment. A processing apparatus 1800 includes modules such as a modulation subsystem, a central processing subsystem, and a peripheral subsystem. The network device in this embodiment may be used as the modulation subsystem in the processing apparatus 1800. Specifically, the modulation subsystem may include a processor 1803 and an interface 1804. The processor 1803 implements a function of the foregoing processing unit, and the interface 1804 implements a function of the foregoing sending unit and/or receiving unit. In another variation, the modulation subsystem includes a memory 1806, a processor 1803, and a program that is stored in the memory and that can run on the processor. When the processor executes the program, the method embodiment performed by the network device is implemented. It should be noted that the memory 1806 may be nonvolatile or volatile. The memory 1806 may be located in the modulation subsystem, or may be located in the processing apparatus 1800, provided that the memory 1806 can be connected to the processor 1803.

In another form of this embodiment, a computer-readable storage medium is provided. The computer-readable storage medium stores instructions. When the instructions are executed, the method performed by the network device is performed.

It should be noted that content, such as information exchange between the modules/units of the apparatus and the execution processes thereof, is based on the same idea as the method embodiment of this application, and produces the same technical effects as the method embodiment of this application. For specific content, refer to the foregoing description in the method embodiment of this application.

In another possible design, when the apparatus is a chip in a device, the chip includes a processing unit and a communication unit. The processing unit may be, for example, a processor. The communication unit may be, for example, an input/output interface, a pin, or a circuit. The processing unit may execute computer-executable instructions stored in a storage unit, to enable the chip in the device to perform the wireless communication method according to any one of the first aspect or the possible designs of the first aspect. Optionally, the storage unit may be a storage unit, such as a register or a buffer, in the chip; or the storage unit may be a storage unit, such as a read-only memory (ROM), another type of static storage device capable of storing static information and instructions, or a random access memory (RAM), in the device but outside the chip.

The processor mentioned above may be a general-purpose central processing unit (CPU), a microprocessor, an application-specific integrated circuit (ASIC), or one or more integrated circuits configured to control program execution of the wireless communication method according to the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, for this application, a software program implementation is a better implementation in most cases. Based on such an understanding, the technical solutions of this application essentially or the part contributing to the current technology may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the method in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A state configuration method, comprising:
    determining, by a terminal device, that a transmission configuration indicator (TCI) state configured by a network device changes;
    obtaining, by the terminal device, a first TCI state configured by the network device before the TCI state changes;
    configuring, by the terminal device, a second TCI state to be the same as the first TCI state, wherein when the second TCI state is the same as the first TCI state, a reference signal indicated by the second TCI state and a reference signal indicated by the first TCI state are quasi co-located; and
    after the TCI state changes and before a third TCI state configured by the network device is activated, sending and receiving, by the terminal device, data by using the second TCI state,
    wherein the determining, by the terminal device, that the TCI state configured by the network device changes comprises:
    receiving, by the terminal device, radio resource configuration (RRC) signaling sent by the network device, wherein the RRC signaling signals the terminal device to switch an uplink bandwidth part (BWP) or a downlink BWP, wherein the uplink BWP switching or the downlink BWP switching causes the change in the TCI state configured by the network device; and determining, by the terminal device based on the received RRC signaling, that the TCI state changes; or
    receiving, by the terminal device, downlink control information (DCI) sent by the network device, wherein the DCI signals the terminal device to switch an uplink BWP or a downlink BWP, and the uplink BWP switching or the downlink BWP switching causes the change in the TCI state configured by the network device; and determining, by the terminal device based on the received DCI signaling, that the TCI state changes; or
    when a timer jointly maintained by the terminal device and the network device expires, switching, by the terminal device, an uplink BWP or a downlink BWP; and determining, by the terminal device based on the timer, that the TCI state changes.

2. The method according to claim 1, wherein the obtaining, by the terminal device, a first TCI state configured by the network device before the TCI state changes comprises:
    obtaining, by the terminal device, the first TCI state corresponding to a first downlink control channel for scheduling the DCI, wherein the first downlink control channel is a downlink control channel before the TCI state changes.

3. The method according to claim 2, wherein the configuring, by the terminal device, a second TCI state to be the same as the first TCI state comprises:
    configuring, by the terminal device, the second TCI state corresponding to a second downlink control channel to be the same as the first TCI state corresponding to the first downlink control channel, wherein the second downlink control channel is a downlink control channel after the TCI state changes.

4. The method according to claim 3, wherein when there are a plurality of second downlink control channels after the TCI state changes, second TCI states corresponding to all the second downlink control channels are the same; or
    a quantity of second downlink control channels and a quantity of first downlink control channels are the same, and a second downlink control channel and a first downlink control channel whose channel identifiers are the same correspond to a same TCI state; or
    when there are a plurality of first downlink control channels before the TCI state changes, the first downlink control channel corresponding to the first TCI state that is the same as the second TCI state is a predefined downlink control channel.

5. The method according to claim 1, wherein the obtaining, by the terminal device, a first TCI state configured by the network device before the TCI state changes comprises:
    obtaining, by the terminal device, the first TCI state corresponding to a first downlink shared channel that carries the DCI, wherein the first downlink shared channel is a downlink shared channel before the TCI state changes.

6. The method according to claim 5, wherein the configuring, by the terminal device, a second TCI state to be the same as the first TCI state comprises:
    configuring, by the terminal device, the second TCI state corresponding to a second downlink shared channel to be the same as the first TCI state corresponding to the first downlink shared channel, wherein the second downlink shared channel is a downlink shared channel after the TCI state changes; or
    configuring, by the terminal device, the second TCI state corresponding to a first uplink shared channel to be the same as the first TCI state corresponding to the first downlink shared channel, wherein the first uplink shared channel is an uplink shared channel after the TCI state changes.

7. A state configuration method, comprising:
    when a transmission configuration indicator (TCI) state configured by a network device changes, obtaining, by the network device, a first TCI state configured by the network device before the TCI state changes;
    configuring, by the network device, a second TCI state to be the same as the first TCI state, wherein when the second TCI state is the same as the first TCI state, a reference signal indicated by the second TCI state and a reference signal indicated by the first TCI state are quasi co-located; and after the TCI state changes and before a third TCI state configured by the network device is activated, sending and receiving, by the network device, data by using the second TCI state, wherein the method further comprises determining, by the network device, that the TCI state configured by the network device changes wherein determining, by the network device, that the TCI state configured by the network device changes comprises:

sending, by the network device, radio resource configuration (RRC) signaling to a terminal device, wherein the RRC signaling signals the terminal device to switch an uplink bandwidth part (BWP) or a downlink BWP, and wherein the uplink BWP switching or the downlink BWP switching causes the change in the TCI state configured by the network device; and determining, by the network device based on the sent RRC signaling, that the TCI state changes; or sending, by the network device, downlink control information (DCI) to a terminal device, wherein the DCI signals the terminal device to switch an uplink BWP or a downlink BWP, and the uplink BWP switching or the downlink BWP switching causes the change in the TCI state configured by the network device; and determining, by the network device based on the sent DCI, that the TCI state changes; or when a timer jointly maintained by the terminal device and the network device expires, and the BWP switching causes the change in the TCI state configured by the network device; and determining, by the network device based on the timer, that the TCI state changes.

8. The method according to claim 7, wherein the obtaining, by the network device, a first TCI state configured by the network device before the TCI state changes comprises:

obtaining, by the network device, the first TCI state corresponding to a first downlink control channel for scheduling the DCI, wherein the first downlink control channel is a downlink control channel before the TCI state changes.

9. The method according to claim 8, wherein the configuring, by the network device, a second TCI state to be the same as the first TCI state comprises:

configuring, by the network device, the second TCI state corresponding to a second downlink control channel to be the same as the first TCI state corresponding to the first downlink control channel, wherein the second downlink control channel is a downlink control channel after the TCI state changes.

10. The method according to claim 7, wherein the obtaining, by the network device, a first TCI state configured by the network device before the TCI state changes comprises:

obtaining, by the network device, the first TCI state corresponding to a first downlink shared channel that carries the DCI, wherein the first downlink shared channel is a downlink shared channel before the TCI state changes.

11. The method according to claim 10, wherein the configuring, by the network device, a second TCI state to be the same as the first TCI state comprises:

configuring, by the network device, the second TCI state corresponding to a second downlink shared channel to be the same as the first TCI state corresponding to the first downlink shared channel, wherein the second downlink shared channel is a downlink shared channel after the TCI state changes; or configuring, by the network device, the second TCI state corresponding to a first uplink shared channel to be the same as the first TCI state corresponding to the first downlink shared channel, wherein the first uplink shared channel is an uplink shared channel after the TCI state changes.

12. A terminal device, comprising:
a processing unit, configured to:
determine that a transmission configuration indicator (TCI) state configured by a network device changes;
obtain a first TCI state configured by the network device before the TCI state changes; and
configure a second TCI state to be the same as the first TCI state, wherein when the second TCI state is the same as the first TCI state, a reference signal indicated by using the second TCI state and a reference signal pointed by using the first TCI state are quasi co-located; and a transceiver unit, configured to, after the TCI state changes and before a third TCI state configured by the network device is activated, send and receive data by using the second TCI state, wherein the transceiver unit is further configured to receive radio resource configuration (RRC) signaling sent by the network device, wherein the RRC signaling signals the terminal device to switch an uplink bandwidth part (BWP) or a downlink BWP, and the uplink BWP switching or the downlink BWP switching causes the change in the TCI state configured by the network device; and the processing unit is configured to determine, based on the received RRC signaling, that the TCI state changes; or wherein the transceiver unit is further configured to receive downlink control information (DCI) sent by the network device, wherein the RRC signaling is used to indicate the terminal device to switch an uplink bandwidth part (BWP) or a downlink BWP, and the uplink BWP switching or the downlink BWP switching causes the change in the TCI state configured by the network device; and the processing unit is configured to determine, based on the received RRC signaling, that the TCI state changes; or wherein the processing unit is configured to when a timer jointly maintained by the terminal device and the network device expires, switch, by the terminal device, an uplink BWP or a downlink BWP; and determine, by the terminal device based on the timer, that the TCI state changes.

13. The terminal device according to claim 12, wherein the processing unit is configured to obtain the first TCI state corresponding to a first downlink control channel for scheduling the DCI, and the first downlink control channel is a downlink control channel before the TCI state changes.

14. The terminal device according to claim 13, wherein the processing unit is configured to configure the second TCI state corresponding to a second downlink control channel to be the same as the first TCI state corresponding to the first downlink control channel, and the second downlink control channel is a downlink control channel after the TCI state changes.

15. The terminal device according to claim 14, wherein when there are a plurality of second downlink control channels after the TCI state changes, second TCI states corresponding to all the second downlink control channels are the same; or a quantity of second downlink control channels and a quantity of first downlink control channels are the same, and a second downlink control channel and a first downlink control channel whose channel identifiers are the same correspond to a same TCI state; or when there are a plurality of first downlink control channels before the TCI state changes, the first downlink control channel corresponding to the first TCI state that is the same as the second TCI state is a predefined downlink control channel.

16. The terminal device according to claim 12, wherein the processing unit is configured to obtain the first TCI state corresponding to a first downlink shared channel that carries the DCI, and the first downlink shared channel is a downlink shared channel before the TCI state changes.

17. The terminal device according to claim 16, wherein the processing unit is configured to configure the second TCI state corresponding to a second downlink shared channel to be the same as the first TCI state corresponding to the first downlink shared channel, and the second downlink shared channel is a downlink shared channel after the TCI state changes; or the processing unit is configured to configure the second TCI state corresponding to a first uplink shared channel to be the same as the first TCI state corresponding to the first downlink shared channel, and the first uplink shared channel is an uplink shared channel after the TCI state changes.

* * * * *